US010772079B2

(12) United States Patent
Nigam et al.

(10) Patent No.: US 10,772,079 B2
(45) Date of Patent: *Sep. 8, 2020

(54) METHOD AND SYSTEM FOR SIGNALLING RESOURCE ALLOCATION INFORMATION IN AN ASYMMETRIC MULTICARRIER COMMUNICATION NETWORK

(71) Applicant: Samsung Electronics Co., Ltd., Suwon-si, Gyeonggi-do (KR)

(72) Inventors: Anshuman Nigam, Bangalore (IN); Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,576

(22) Filed: Nov. 21, 2018

(65) Prior Publication Data

US 2019/0090221 A1 Mar. 21, 2019

Related U.S. Application Data

(63) Continuation of application No. 14/021,953, filed on Sep. 9, 2013, now Pat. No. 10,142,964.

(30) Foreign Application Priority Data

Sep. 7, 2012 (IN) ............................ 3710/CHE/2012
Oct. 17, 2012 (IN) ............................ 4332/CHE/2012
May 28, 2013 (IN) ............................ 3710/CHE/2012

(51) Int. Cl.
*H04W 72/04* (2009.01)

(52) U.S. Cl.
CPC ......... *H04W 72/04* (2013.01); *H04W 72/042* (2013.01); *H04W 72/0453* (2013.01)

(58) Field of Classification Search
CPC ............... H04W 72/04; H04W 72/042; H04W 72/0453; H04L 5/0053
See application file for complete search history.

(56) References Cited

U.S. PATENT DOCUMENTS 5,943,324 A 8/1999 Ramesh et al.
2002/0176398 A1 11/2002 Nidda
(Continued)

FOREIGN PATENT DOCUMENTS

KR 10-2011-0084976 A 7/2011
WO 2012078565 A1 6/2012
WO 2012091443 A2 7/2012

OTHER PUBLICATIONS

International Search Report dated Dec. 2, 2013 in connection with International Patent Application No. PCT/KR2013/007924, 4 pages.
(Continued)

*Primary Examiner* — Gregory B Sefcheck
*Assistant Examiner* — Joshua Smith

(57) ABSTRACT

A method and system signal resource allocation information in an asymmetric multicarrier communication network. A MS communicates with a BS using asymmetric carriers consisting of at least one low frequency carrier (e.g., primary carriers) in a cellular band and at least one high frequency carrier secondary carriers) in a millimeter Wave band. In one embodiment, the BS allocates resources for one or more transmit time intervals in at least one of DL allocation interval of a secondary DL carrier and UL allocation interval of a secondary UL carrier for the MS, where the DL allocation interval spans one or more subframes of the secondary DL carrier and the UL allocation interval spans one or more subframes of the secondary UL carrier. The BS then transmits information regarding the allocated resources
(Continued)

to the MS in a Packet Data Control Channel region of a subframe of the primary DL carrier.

19 Claims, 36 Drawing Sheets

(56) References Cited

U.S. PATENT DOCUMENTS

| | | |
|---|---|---|
| 2007/0153749 A1 | 7/2007 | Waxman |
| 2008/0084853 A1 | 4/2008 | Kuchibhotla et al. |
| 2009/0052387 A1 | 2/2009 | Lee et al. |
| 2009/0103651 A1 | 4/2009 | Lahtonen et al. |
| 2009/0181689 A1 | 7/2009 | Lee et al. |
| 2009/0185632 A1* | 7/2009 | Cai ............... H04L 5/0044 375/260 |
| 2009/0196204 A1 | 8/2009 | Astely et al. |
| 2009/0310477 A1 | 12/2009 | Lee et al. |
| 2010/0027446 A1 | 2/2010 | Choi et al. |
| 2010/0227638 A1 | 9/2010 | Park et al. |
| 2010/0322180 A1 | 12/2010 | Kim et al. |
| 2010/0322229 A1 | 12/2010 | Kim et al. |
| 2011/0013543 A1* | 1/2011 | Lim ............... H04W 72/042 370/281 |
| 2011/0019597 A1* | 1/2011 | Moon ............... H04W 16/14 370/281 |
| 2011/0044239 A1 | 2/2011 | Cai et al. |
| 2011/0044261 A1 | 2/2011 | Cai et al. |
| 2011/0194514 A1 | 8/2011 | Lee et al. |
| 2011/0274066 A1 | 11/2011 | Tee et al. |
| 2012/0009923 A1 | 1/2012 | Chen et al. |
| 2012/0039180 A1 | 2/2012 | Kim et al. |
| 2012/0063351 A1 | 3/2012 | Kim et al. |
| 2012/0113941 A1* | 5/2012 | Chung ............... H04L 27/2602 370/329 |
| 2012/0207123 A1 | 8/2012 | Seo et al. |
| 2012/0218954 A1 | 8/2012 | Barbieri et al. |
| 2013/0250822 A1 | 9/2013 | Yang et al. |
| 2014/0050186 A1* | 2/2014 | Kim ............... H04W 56/0045 370/329 |
| 2015/0131536 A1 | 5/2015 | Kaur et al. |

OTHER PUBLICATIONS

Written Opinion of the International Searching Authority dated Dec. 2, 2013 in connection with International Patent Application No. PCT/KR2013/007924, 5 pages.

Extended European Search Report issued for EP 13834577.2 dated Mar. 11, 2016, 9 pgs.

Samsung, "Cross-Carrier Scheduling of PUSCH for TDD CA", R1-120160, 3GPP TSG RAN WG1 #68, Jan. 31, 2012, 3 pgs.

Notification of the Reasons for Rejection in connection with Korean Application No. 10-2013-0106578 dated Dec. 11, 2019, 36 pages.

\* cited by examiner

702 — ALLOCATE RESOURCES FOR ONE OR MORE TTIs IN AT LEAST ONE DL ALLOCATION INTERVAL IN A SECONDARY DL CARRIER AND UL ALLOCATION INTERVAL IN A SECONDARY UL CARRIER, WHERE THE DL ALLOCATION INTERVAL AND THE UL ALLOCATION INTERVAL SPAN MULTIPLE SUBFRAMES OF THE SECONDARY DL CARRIER AND THE SECONDARY UL CARRIER, RESPECTIVELY

704 — TRANSMIT INFORMATION REGARDING THE ALLOCATED RESOURCES TO THE MS IN A PDCCH REGION OF A SUBFRAME OF A PRIMARY DL CARRIER, WHERE THE DL ALLOCATION INTERVAL STARTS AT A FIRST PRE-DEFINED OFFSET AND THE UL ALLOCATION INTERVAL STARTS AT A SECOND PRE-DEFINED OFFSET DURING TIME DURATION OF THE SUBFRAME OF THE PRIMARY DL CARRIER

METHOD AND SYSTEM FOR SIGNALLING RESOURCE ALLOCATION INFORMATION IN AN ASYMMETRIC MULTICARRIER COMMUNICATION NETWORK

CROSS-REFERENCE TO RELATED APPLICATION(S) AND CLAIM OF PRIORITY

The present application is a continuation of application Ser. No. 14/021,953, filed Sep. 9, 2013, which claims priority to Indian Application No. 3710/CHE/2012, filed, Sep. 7, 2012, Indian Application No. 4332/CHE/2012, filed Oct. 17, 2012, and Indian Application No. 3710/CHE/2012, filed May 28, 2013, the entire disclosures of which are hereby incorporated by reference.

BACKGROUND

1. Field

The present disclosure relates to the field of asymmetric multicarrier system, and more particularly relates to a method and system for signaling resource allocation information in an asymmetric multicarrier communication network.

2. Description of Related Art

In the recent years, several broadband wireless technologies have been developed to meet growing number of broadband subscribers and to provide more and better applications and services. For example, the Third Generation Partnership Project 2 (3GPP2) developed Code Division Multiple Access 2000 (CDMA 2000), 1× Evolution Data Optimized (1×EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there is an increasing need for mobile communication system with large capacity, high throughput, lower latency and better reliability.

Super Mobile Broadband (SMB) system based on millimeter waves, i.e., radio waves with wavelength in range of 1 millimeter (mm) to 10 mm, corresponds to a radio frequency of 30 Gigahertz (GHz) to 300 GHz, is a candidate for next generation mobile communication technology as vast amount of spectrum is available in a millimeter Wave band. In general, an SMB network consists of multiple SMB base stations (BSs) that cover a geographic area. In order to ensure good coverage, SMB base stations need to be deployed with higher density than macro-cellular base stations. In general, SMB base stations are recommended to be deployed roughly the same site-to-site distance as microcell or pico-cell deployment in an urban environment. Typically, transmission and/or reception in an SMB system are based on narrow beams, which suppress the interference from neighboring SMB base stations and extend the range of an SMB link. However due to high path loss, heavy shadowing and rain attenuation reliable transmission at higher frequencies is one of the key issues that need to be overcome in order to make the SMB system a practical reality.

Lower frequencies in a cellular band having robust link characteristics can be utilized with higher frequencies in a millimeter wave (mmWave) band to overcome reliability issues in the SMB systems. In an asymmetric multicarrier communication network, a mobile station (MS) communicates with a base station using asymmetric multiband carriers consisting of at least one low frequency carrier in the cellular band and at least one high frequency carrier in the mmWave band. The primary carrier i.e., carrier operating on low frequencies and the secondary carrier i.e., carrier operating on high frequencies may be transmitted by same BS or different BS. Since the transmission characteristics of low frequency carriers in the cellular band and high frequency carriers in the mmWave band is quite different, transmission time intervals (TTIs) and the frame structures for the primary carrier and secondary carrier may not be same. An example of frame structure for a primary carrier in the cellular band where the operation is based on 3rd Generation Partnership Projects (3GPP) Long Term Evolution (LTE) Standard, and frame structure for a secondary carrier in the mmWave band is illustrated in FIG. 1. In frame structure for the primary carrier in the cellular band, one radio frame of length 10 milliseconds is divided into 10 radio subframes which are further sub-divided into two slots. Each slot is further composed of six or seven Orthogonal Frequency Division Multiplexing (OFDM) symbols. The BS transmits control information in the first three or the first four OFDM symbols of the first slot. The control information is intended for the both the slots of a sub frame. A control channel carrying the control information is referred to as Physical Downlink Control Channel (PDCCH) in 3GPP LTE terminology. In a frame structure for the secondary carrier in mmWave band, a radio frame of 5 milliseconds is composed of 5 subframes of 1 ms each. Each subframe is composed of P=60 slots and each slot is composed of n=4 OFDM symbols.

In an asymmetric multicarrier communication network, a low frequency carrier in a cellular band can be used to signal resource allocation information for high frequency carrier in an mmWave band for reliably signaling the resource allocation information. However, frame structure and transmit time intervals for high frequency carrier is different than those for low frequency carrier.

SUMMARY

Various embodiments of the present disclosure provide a method and system for signaling resource allocation information in an asymmetric multicarrier communication network. In one embodiment a MS communicates with a BS using asymmetric carriers consisting of at least one low frequency carrier (e.g., primary carriers) in a cellular band and at least one high frequency carrier secondary carriers) in a millimeter Wave band. In one embodiment, the BS allocates resources for one or more transmit time intervals in at least one of DL allocation interval of a secondary DL carrier and UL allocation interval of a secondary UL carrier for the MS, where the DL allocation interval spans one or more subframes of the secondary DL carrier and the UL allocation interval spans one or more subframes of the secondary LI carrier. The BS then transmits information regarding the allocated resources to the MS in a Packet Data Control Channel region of a subframe of the primary DL carrier.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a flowchart for an exemplary method of allocating resources to the MS, according to another embodiment.

The drawings described herein are for illustration purposes only and are not intended to limit the scope of the present disclosure in any way.

DETAILED DESCRIPTION

FIGS. 1 through 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The present disclosure provides a method and system for signaling resource allocation information in an asymmetric multicarrier communication network. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
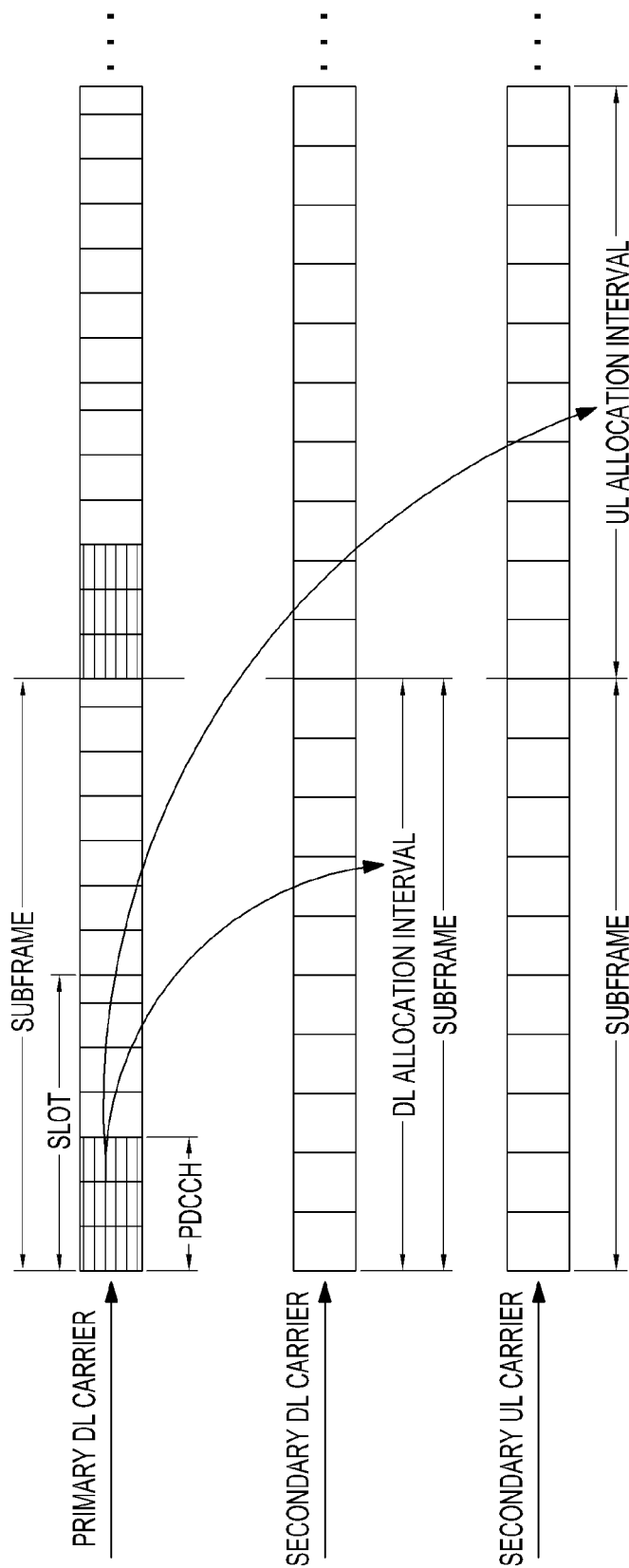
FIG. 1 illustrates a schematic representation of frame structures of a primary Downlink (DL) carrier, secondary DL carrier and a secondary Uplink (UL) carrier, according to a prior art.
Figure 2A:
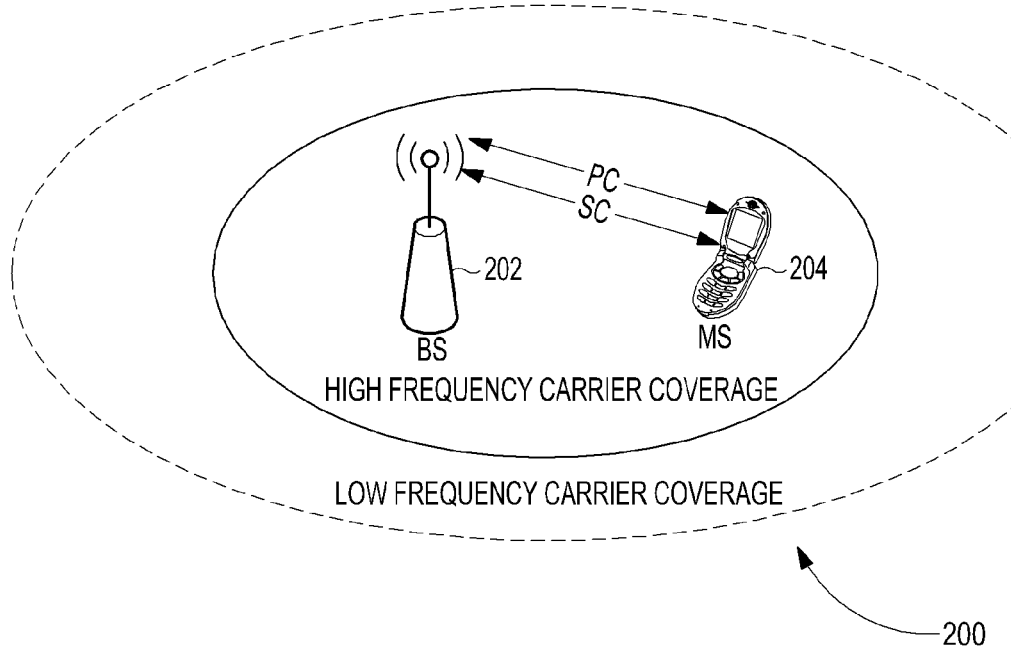
FIG. 2A illustrates a schematic diagram of an asymmetric multicarrier communication network where a primary carrier and a secondary carrier are transmitted by a same base station (BS).
Figure 2B:
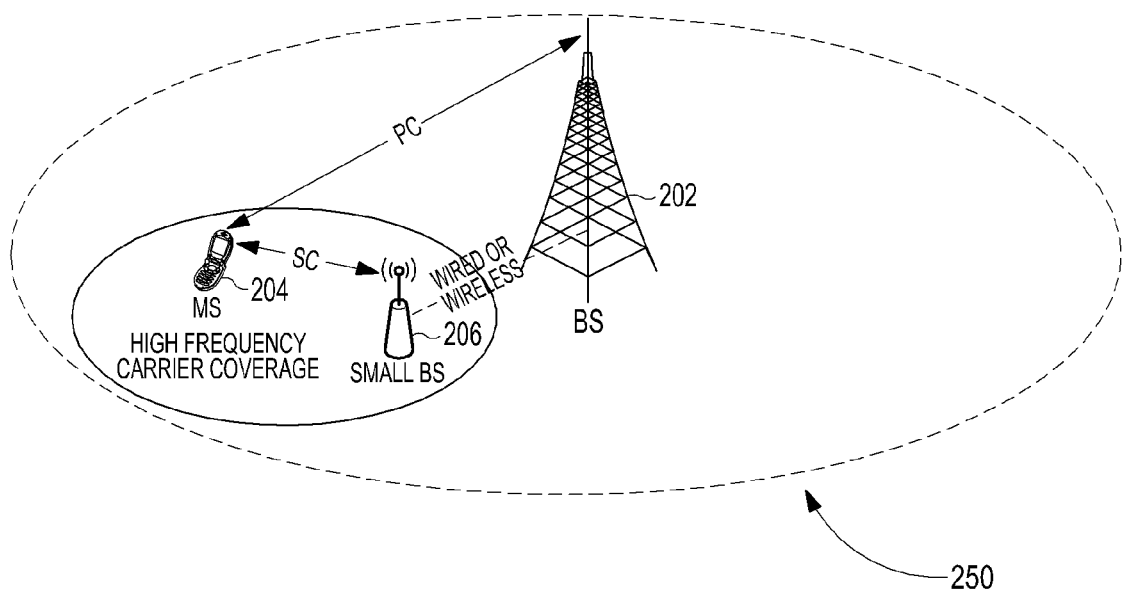
FIG. 2B illustrates a schematic diagram of another asymmetric multicarrier communication network where a primary carrier and a secondary carrier are transmitted by different BSs.

In an asymmetric multicarrier communication network, a mobile station (MS) communicates with a base station using asymmetric carriers consisting of at least one low frequency carrier in a cellular band and at least one high frequency carrier in a millimeter Wave band. The primary carrier, i.e., carrier operating on low frequencies, is used to transmit control information including resource allocation information for a secondary carrier, i.e., carrier operating on high frequencies. The primary carrier and the secondary carrier may be transmitted by same base station (BS) or different BS. FIG. 2A illustrates a schematic diagram 200 of an asymmetric multicarrier communication network where a primary carrier and a secondary carrier are transmitted by a same BS 202. FIG. 2B illustrates a schematic diagram 250 of another asymmetric multicarrier communication network where a primary carrier and a secondary carrier are transmitted by different BSs 202. In asymmetric multicarrier communication network, transmit time intervals (TTIs) and frame structures for the primary carrier are different than those of the secondary carrier. The present disclosure is applicable to any asymmetric multicarrier communication network, wherein at least one of transmit time interval (TTI) and frame structures on primary carrier are different than those of secondary carriers.

For the purpose explanation, low frequency carrier operation as defined in 3GPP LTE system is considered. However, the present disclosure is equally applicable to any other cellular broadband system. Further, control information is referred to in particular for resource allocation information; however the disclosure can be used for other types of control information wherever applicable.

Figure 3:
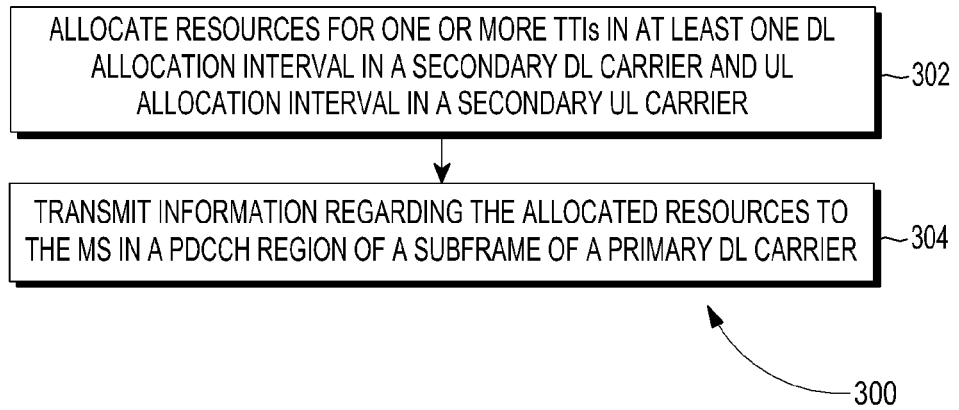
FIG. 3 illustrates a flowchart for a method of allocating resources to a mobile station (MS), according to one embodiment.

FIG. 3 illustrates a flowchart 300 for a method of allocating resources to the MS 204, according to one embodiment. At step 302, resources for one or more transmit time intervals (TTIs) in at least one of DL allocation interval of a secondary DL carrier (e.g., Super Mobile Broadband (SMB) DL carrier) and UL allocation interval of a secondary UL carrier (e.g., SMB UL carrier) are allocated for the MS 204, where the DL allocation interval spans one or more subframes of the secondary DL carrier and the UL allocation interval spans one or more subframes of the secondary UL carrier. At step 304, information regarding the allocated resources is transmitted to the MS 204 in a PDCCH region of a subframe of a primary DL carrier (e.g., Long Term Evolution (LTE) carrier). In one embodiment, the information regarding the allocated resources is transmitted using SMB-Physical Downlink Control Channel (S-PDCCH) in a region designated for Physical Downlink Control Channel (PDCCH). In this embodiment, the information regarding the allocated resources is transmitted in first three or first four symbols of a first slot in the subframe of the primary DL carrier. The S-PDCCH may span one or more Orthogonal Frequency Division Multiplexing (OFDM) symbols in the PDCCH region. It can be noted that, the physical layer transmission of S-PDCCH follows PDCCH transmission attributes coding, modulation, etc.).

Figure 4A:
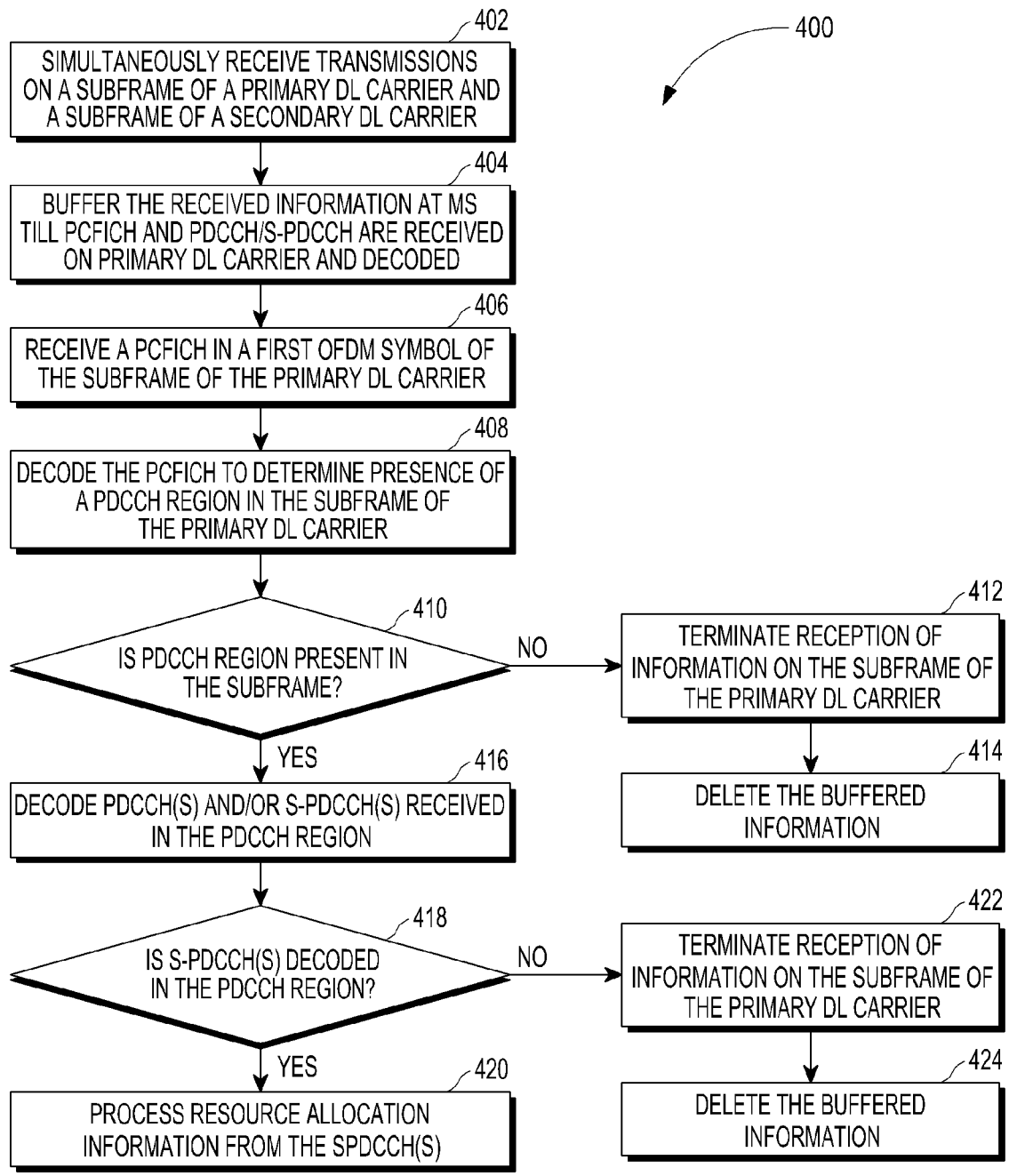
FIG. 4A illustrates a flowchart for a method of receiving and processing resource allocation information from the BS, according to one embodiment.

FIG. 4A illustrates a process flowchart 400 for a method of receiving and processing resource allocation information from the BS 202, according to one embodiment. At step 402, transmissions are simultaneously received by the MS 204 on a subframe of a primary DL carrier and a subframe of a secondary DL carrier. At step 404, the transmissions received on the subframe of secondary DL carrier is buffered at the MS 204 till Physical Control Format Indicator Channel (PCFICH) and PDCCH/S-PDCCH are received on the primary DL carrier and decoded by the MS 204.

At step 406, PCFICH is received in a first Orthogonal Frequency Division Multiplexing (OFDM) symbol of the subframe of the primary DL carrier. At step 408, the PCFICH is decoded to determine presence of a PDCCH region in the subframe of the primary DL carrier. At step 410, it is determined whether the PDCCH region is present in the subframe of the primary DL carrier. If the PDCCH region is not present in the subframe of the primary DL carrier, then at step 412, reception of information on the subframe of the primary DL carrier and the subframe of the secondary DL carrier is terminated. Also, at step 414, the information received on the secondary DL carrier and buffered at the MS 204 is deleted.

If the PDCCH region is present in the subframe of the primary DL carrier, then at step 416, PDCCH(s) and/or S-PDCCH(s)) received in the PDCCH region are decoded. At step 418, it is determined whether one or more S-PDCCHs are decoded in the PDCCH region. If the one or more S-PDCCHs are decoded in the PDCCH region, then at step 420, the resource allocation information decoded from the one or more S-PDCCHs is processed. The resource allocation information indicates resources allocated for one or more transmit time intervals in at least one DL allocation interval in the secondary downlink carrier and UL allocation interval in the secondary UL carrier. In one embodiment, the resource allocation information enables to decode PHY burst(s) transmitted in one or more TTIs in the DL allocation interval. In another embodiment, the resource allocation information enables to transmit PHY burst(s) in one or more TTIs in the UL allocation interval. If the one or more S-PDCCH(s) are not decoded from the PDCCH region, then at step 422, reception of information on the subframe of the primary DL carrier and the subframe of the secondary DL carrier are terminated. Also, at step 424, the information received in the secondary DL carrier and buffered at the MS 204 is deleted. It is understood that, the method steps 402 to 424 are applicable for frame structures illustrated in FIG. 6.

Figure 4B:
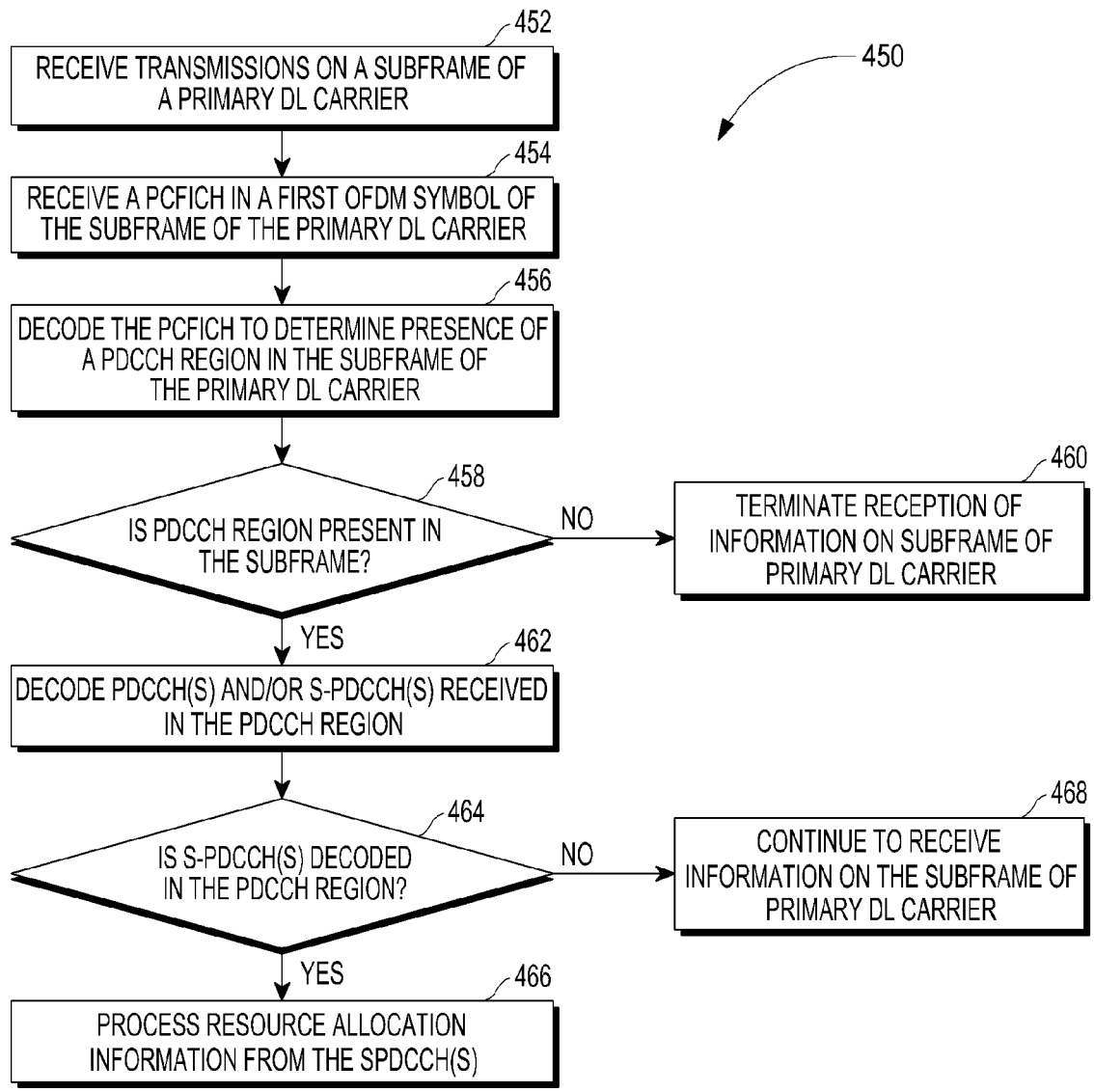
FIG. 4B illustrates a flowchart for a method of receiving and processing resource allocation information from the BS, according to another embodiment.

FIG. 4B illustrates a flowchart 450 for a method of receiving and processing resource allocation information from the BS, according to another embodiment. At step 452, transmissions are received by the MS 204 on a subframe of a primary DL carrier. At step 454, Physical Control Format Indicator Channel (PCFICH) is received in a first Orthogonal Frequency Division Multiplexing (OFDM) symbol of the subframe of the primary DL carrier. At step 456, the PCFICH is decoded to determine presence of a PDCCH region in the subframe of the primary DL carrier. At step 458, it is determined whether the PDCCH region is present in the subframe of the primary DL carrier. If the PDCCH region is not present in the subframe of the primary DL carrier, then at step 460, reception of information on the subframe of the primary DL carrier is terminated.

If the PDCCH region is present in the subframe of the primary DL carrier, then at step 462, PDCCH(s) and/or S-PDCCH(s)) received in the PDCCH region are decoded. At step 464, it is determined whether one or more S-PDCCHs are decoded in the PDCCH region. If the one or more S-PDCCHs are decoded in the PDCCH region, then at step 466, the resource allocation information decoded from the one or more S-PDCCHs is processed. The resource allocation information indicates resources allocated for one or more transmit time intervals in at least one DL allocation interval in the secondary downlink carrier and UL allocation interval in the secondary UL carrier. In one embodiment, the resource allocation information enables to decode PHY burst(s) transmitted in one or more TTIs in the DL allocation interval. In another embodiment, the resource allocation information enables to transmit PHY burst(s) in one or more TTIs in the UL allocation interval. If the one or more S-PDCCH(s) are not decoded from the PDCCH region, then at step 468, reception of information on the subframe of the primary DL carrier is continued. It is understood that, the method steps 452 to 468 are applicable for frame structures illustrated in FIGS. 8, 12, 14, 16, 18, and 20.

Figure 5:
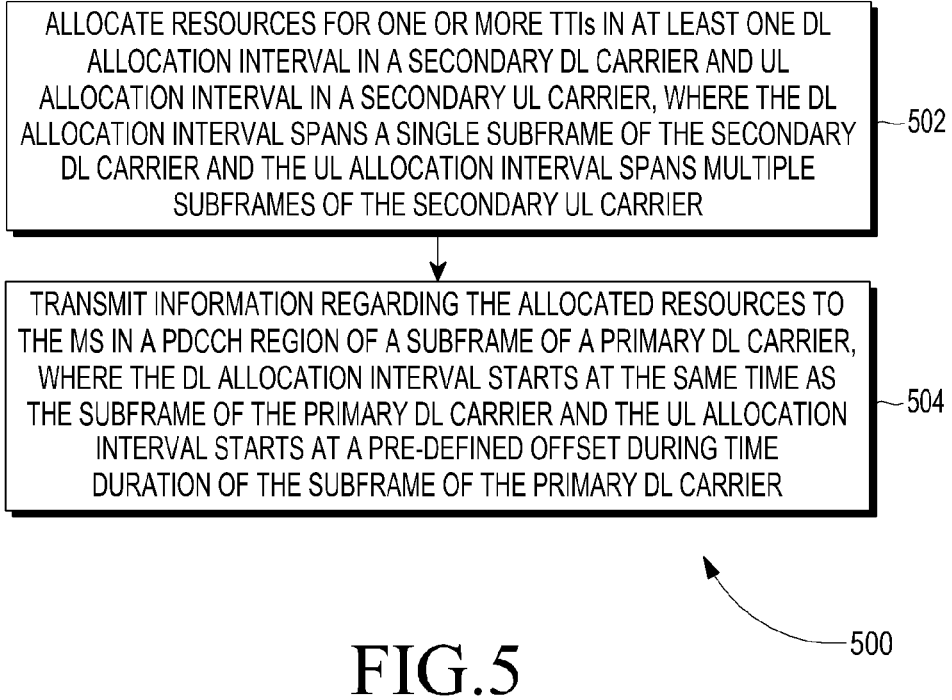
FIG. 5 illustrates a flowchart for an exemplary method of allocating resources to the MS, according to one embodiment.

FIG. 5 illustrates a flowchart 500 for an exemplary method of allocating resources to the MS 204, according to one embodiment. At step 502, resources for one or more transmit time intervals in at least one of DL allocation interval of a secondary DL carrier (e.g., SMB DL carrier) and UL allocation interval of a secondary UL carrier (e.g., SMB UL carrier) are allocated for the MS 204, where the DL allocation interval spans a single subframe of the secondary DL carrier and the UL allocation interval spans multiple subframes of the secondary UL carrier. At step 504, information regarding the allocated resources is transmitted to the MS 204 in a PDCCH region of a subframe of a primary DL carrier. It can be noted that, the subframes of primary DL carrier, the subframes of the secondary DL carrier and the subframes of the secondary UL carrier are time aligned with each other. Further, the DL allocation interval starts at the same time as the subframe of the primary DL carrier in which the resource allocation information for the DL allocation interval is transmitted. On the other hand, the UL allocation interval in the secondary UL carrier starts at a pre-defined offset during the time duration of the subframe of the primary DL carrier in which the resource allocation information for the UL allocation interval is transmitted.

Figure 6:
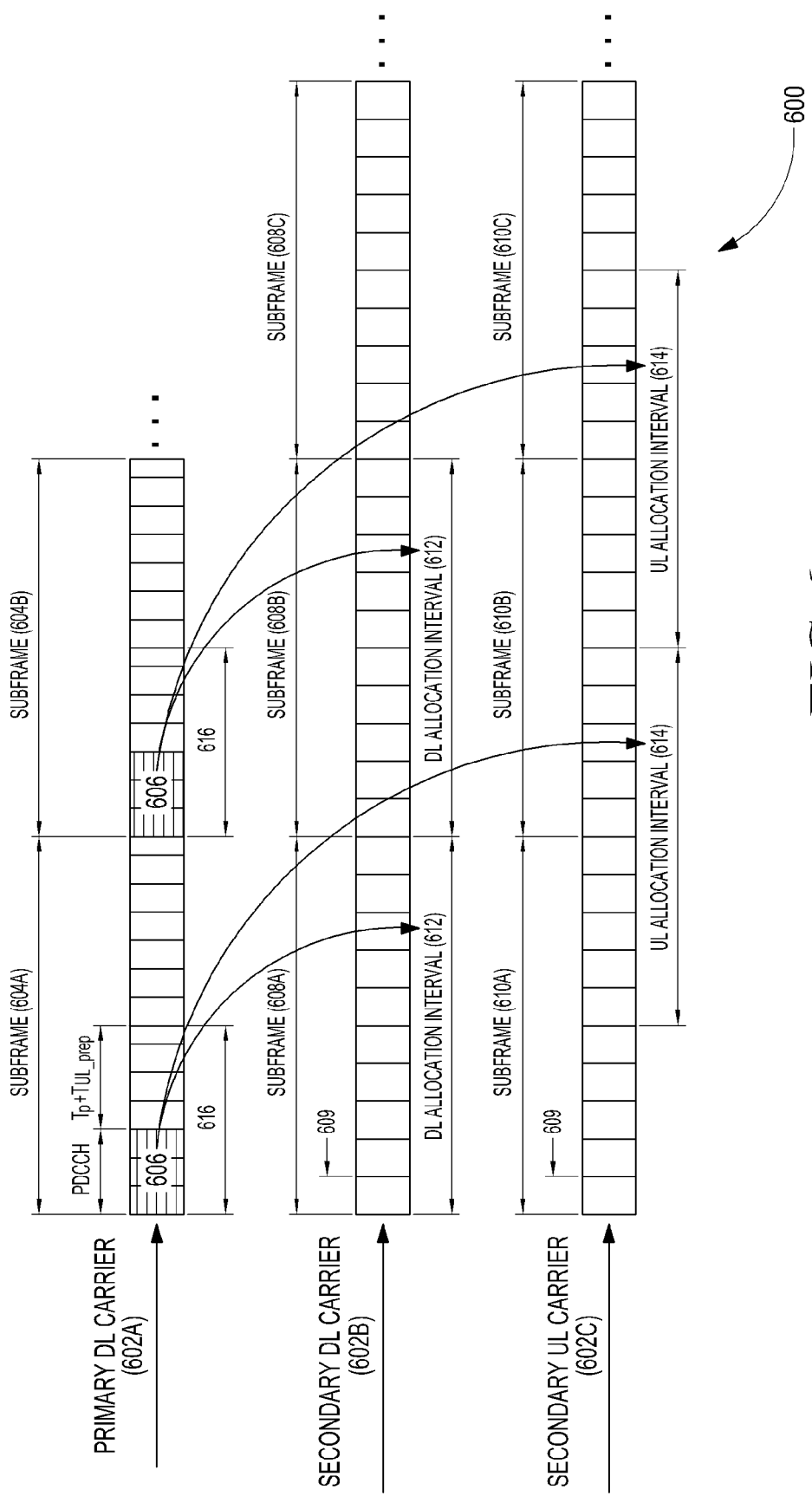
FIG. 6 illustrates a schematic representation of frame structures associated with a primary DL carrier, a secondary DL carrier, and a secondary UL carrier, according to one embodiment.

FIG. 6 illustrates a schematic representation 600 of frame structures 602A-602C associated with a primary Downlink (DL) carrier, a secondary DL carrier, and a secondary uplink (UL) carrier, according to one embodiment. In an exemplary implementation, the primary DL carrier may be a low frequency carrier in a long term evolution (LTE) band. In this exemplary implementation, the secondary DL carrier and the secondary UL carrier may be high frequency carrier in an mmWave band. One can envision that the primary DL carrier, the secondary DL carrier, and the secondary UL carrier may be associated with a frequency band associated with any radio access technology.

The frame structure 602A includes a plurality of subframes 604A-N of 1 millisecond duration. Each subframe is a transmit time interval for data packet. The starting of the each subframe 604 contains a control region 606 for transmitting information on resources allocated to the MS 204 followed by a data region for transmitting data packets in downlink direction.

The frame structure 602B includes a plurality of subframes 608A-N of 1 millisecond duration. Similarly, the frame structure 602C includes a plurality of subframes 610A-N. Each of the subframes 608A-N and 610A-N of the secondary DL carrier and the secondary UL carrier is divided into plurality of Transmit Time Intervals (TTIs) 609 of 0.1 millisecond duration. It can be noted that, the TTIs of each subframe of the secondary DL carrier and the secondary UL carrier are smaller time duration than a TTI in the primary DL carrier. The subframes 608A-N and the subframes 610A-N of the secondary DL carrier and the secondary UL carrier are time aligned with the subframes of the primary DL carrier.

According to the present disclosure, the base station 202 transmits information on allocated resources in the PDCCH region 606 of each subframe 604 of the primary DL carrier. The resource allocation information indicates resources allocated to the MS 204 for one or more transmit time intervals (TTIs) in a DL allocation interval 612 of the secondary DL carrier and an UL allocation interval 614 in the secondary UL carrier. The duration of the DL allocation interval 612 and the UL allocation interval 614 is equal to one subframe duration. Alternatively, the duration of the DL allocation interval 612 and the UL allocation interval 614 can be more than one subframe duration. As shown in FIG. 6, the DL allocation interval 612 spans a single subframe of the secondary DL carrier and the UL allocation interval 614 spans multiple subframes of the secondary UL carrier. For example, the DL allocation interval 612 spans the subframe 608A while the UL allocation interval 614 spans the subframes 610A and 610B. That is, the DL allocation interval 612 starts at the same time as the subframe 604 of the primary DL carrier 604 in which the allocated resources for said DL allocation interval 612 are transmitted. The UL allocation interval 614 starts at a predefined offset 616 during time duration of the subframe 604 of the primary DL carrier in which the resource information for said UL allocation interval 614 is transmitted. The predefined offset 616 is equal to at least one of time duration of the PDCCH region 606 in which the resource information is transmitted, time duration required for processing the resource information, time duration required to switch from primary carrier to secondary carrier, time duration required to synchronize with the secondary carrier, time duration required to prepare uplink packet based on received resource allocation information, and time duration required for uplink timing advance. In some embodiments, maximum timing advance supported by the system 200 may be considered to calculate the predefined offset 616. The pre-defined offset 616 may also include the time required to do beamforming. In beam-formed system, prior to transmission, appropriate beamforming needs to be performed in order to identify best transmit beam direction.

FIG. 7 illustrates a flowchart 700 for an exemplary method of allocating resources to the MS 204, according to another embodiment. At step 702, resources for one or more transmit time intervals in at least one of DL allocation interval of a secondary DL carrier (e.g., SMB DL carrier) and UL allocation interval of a secondary UL carrier (e.g., SMB UL carrier) are allocated for the MS 204, where the DL allocation interval and the UL allocation interval spans multiple subframes of the secondary DL carrier and the secondary UL carrier, respectively.

At step 704, information regarding the allocated resources is transmitted to the MS 204 in a PDCCH region of a subframe of a primary DL carrier. It can be noted that, the subframes of primary DL carrier, the subframes of the secondary DL carrier and the subframes of the secondary UL carrier are time aligned with each other. Further, the DL allocation interval starts at a first pre-defined offset during the time duration of the subframe of the primary DL carrier in which the resource allocation information for the DL allocation interval is transmitted. Similarly, the UL allocation interval in the secondary UL carrier starts at a second pre-defined offset during the time duration of the subframe of the primary DL carrier in which the resource allocation information for the UL allocation interval is transmitted.

Figure 8:
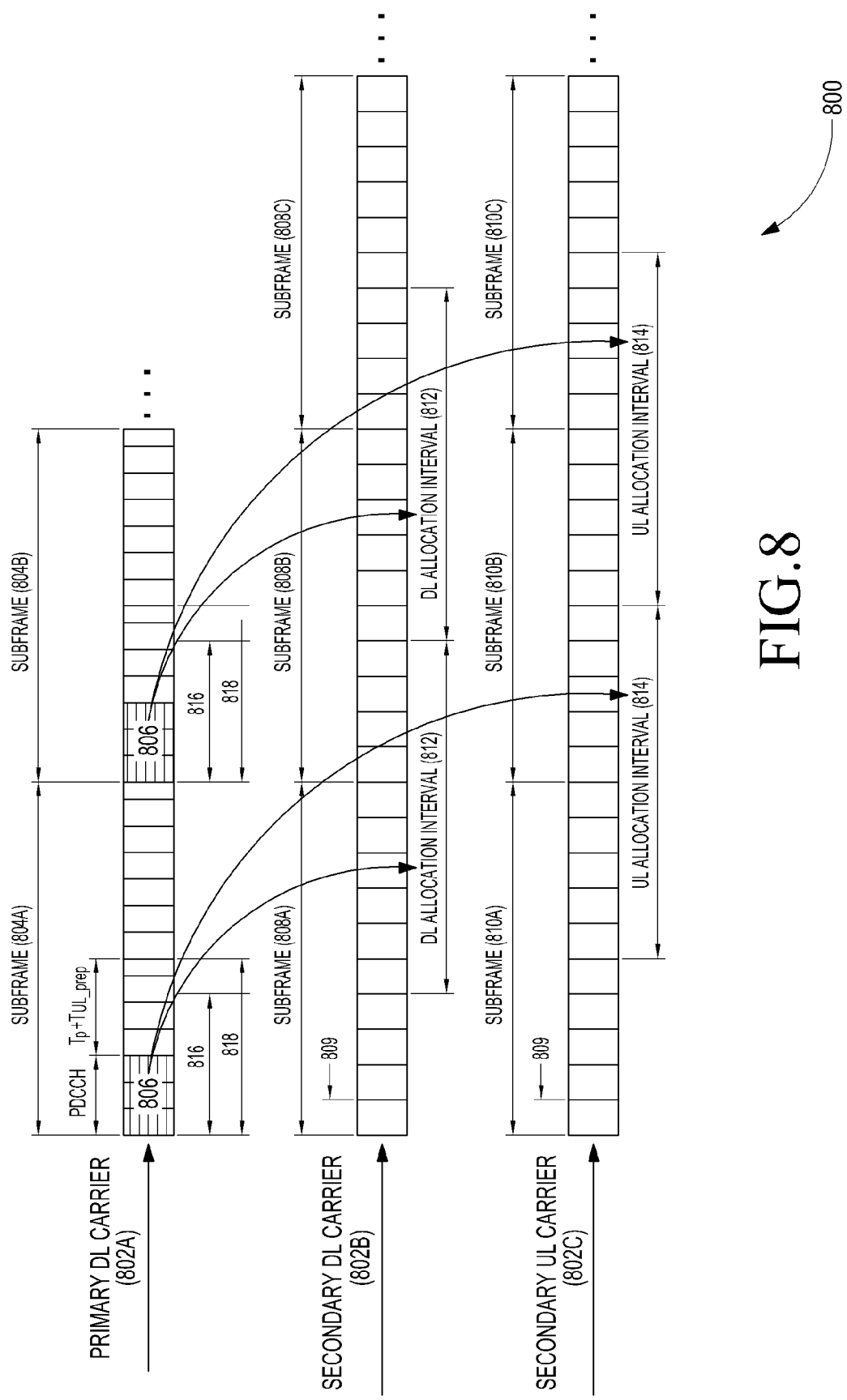
FIG. 8 illustrates a schematic representation of frame structures associated with a primary DL carrier, a secondary DL carrier, and a secondary UL carrier, according to another embodiment.

FIG. 8 illustrates a schematic representation 800 of frame structures 802A-802C associated with a primary Downlink (DL) carrier, a secondary DL carrier, and a secondary uplink (UL) carrier, according to another embodiment. It can be seen that the schematic representation 800 of FIG. 8 is a similar to the schematic representation 600 of FIG. 6, except the DL allocation interval 812 spans multiple subframes of the secondary DL carrier. For example, the DL allocation interval 812 spans the subframes 808A and 808B and the UL allocation interval 814 spans the subframes 810A and 810B. That is, the DL allocation interval 812 starts at a first predefined offset 816 during time duration of the subframe 804 of the primary DL carrier in which the allocated resources for said DL allocation interval 812 are transmitted. The first predefined offset 816 is equal to at least one of time duration of the PDCCH region 806 in which resource allocation information is transmitted, time duration required for processing the resource allocation information, time duration required to switch from primary carrier to secondary carrier, and time duration require to synchronize with the secondary carrier. The first predefined offset 816 may also include time duration required to perform beamforming. In beam-formed system, prior to reception, appropriate beamforming needs to be performed in order to identify best transmit beam direction.

The UL allocation interval 814 starts at a second predefined offset 818 during time duration of the subframe 804 of the primary DL carrier in which the resource information for said UL allocation interval 814 is transmitted. The second predefined offset 818 is equal to at least one of time duration of the PDCCH region 806 in which the resource information is transmitted, time duration required for processing the resource information, time duration required to switch from primary carrier to secondary carrier, time duration required to synchronize with the secondary carrier, time duration required to prepare uplink packet based on received resource allocation information, and time duration required for uplink timing advance. In some embodiments, maximum timing advance supported by the system 200 may be considered to calculate the second predefined offset 818. The second predefined offset 818 may also include time duration required to perform beamforming. In beam-formed system, prior to transmission, appropriate beamforming needs to be performed in order to identify best transmit beam direction.

Figure 9:
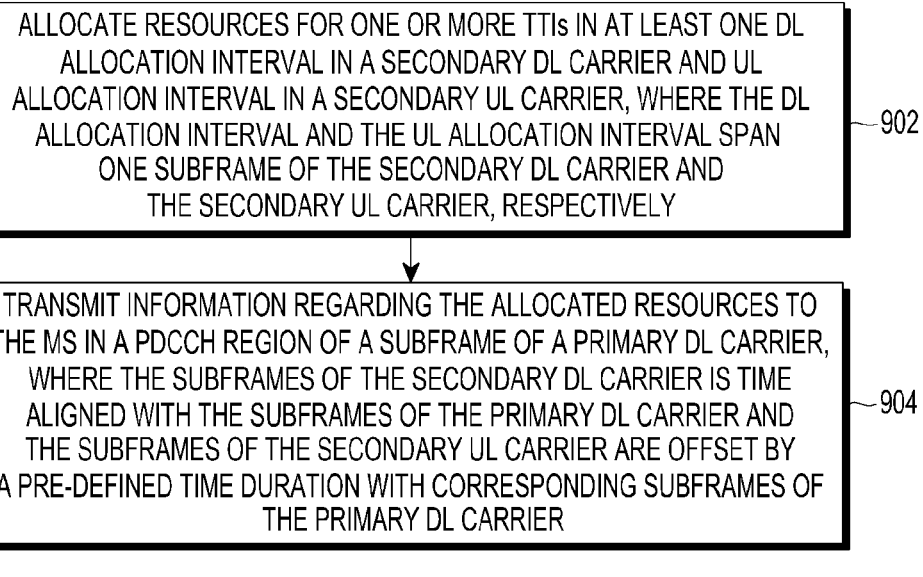
FIG. 9 illustrates a flowchart of an exemplary method of allocating resources to the MS, according to yet another embodiment.

FIG. 9 illustrates a flowchart 900 for an exemplary method of allocating resources to the MS 204, according to yet another embodiment. At step 902, resources for one or more transmit time intervals in at least one of DL allocation interval of a secondary DL carrier (e.g., SAM DL carrier) and UL allocation interval of a secondary UL carrier (e.g., SMB UL carrier) are allocated for the MS 204, where the DL allocation interval and the UL allocation interval spans one subframe of the secondary DL carrier and the secondary UL carrier, respectively.

At step 904, information regarding the allocated resources is transmitted to the MS 204 in a PDCCH region of a subframe of a primary DL carrier. It can be noted that, the subframes of the secondary DL carrier is time aligned with the subframes of the primary DL carrier whereas the subframes of the secondary UL carrier are offset by a pre-defined time duration with corresponding subframes of the primary DL carrier. Further, the DL allocation interval starts at the same time as the subframe of the primary DL carrier in which the resource allocation information for the DL allocation interval is transmitted. Similarly, the UL allocation interval in the secondary UL carrier starts at the same time as the subframe of the secondary UL carrier which starts at the pre-defined offset from the subframe of the primary DL carrier in which the resource allocation information for the UL allocation interval is transmitted.

Figure 10:
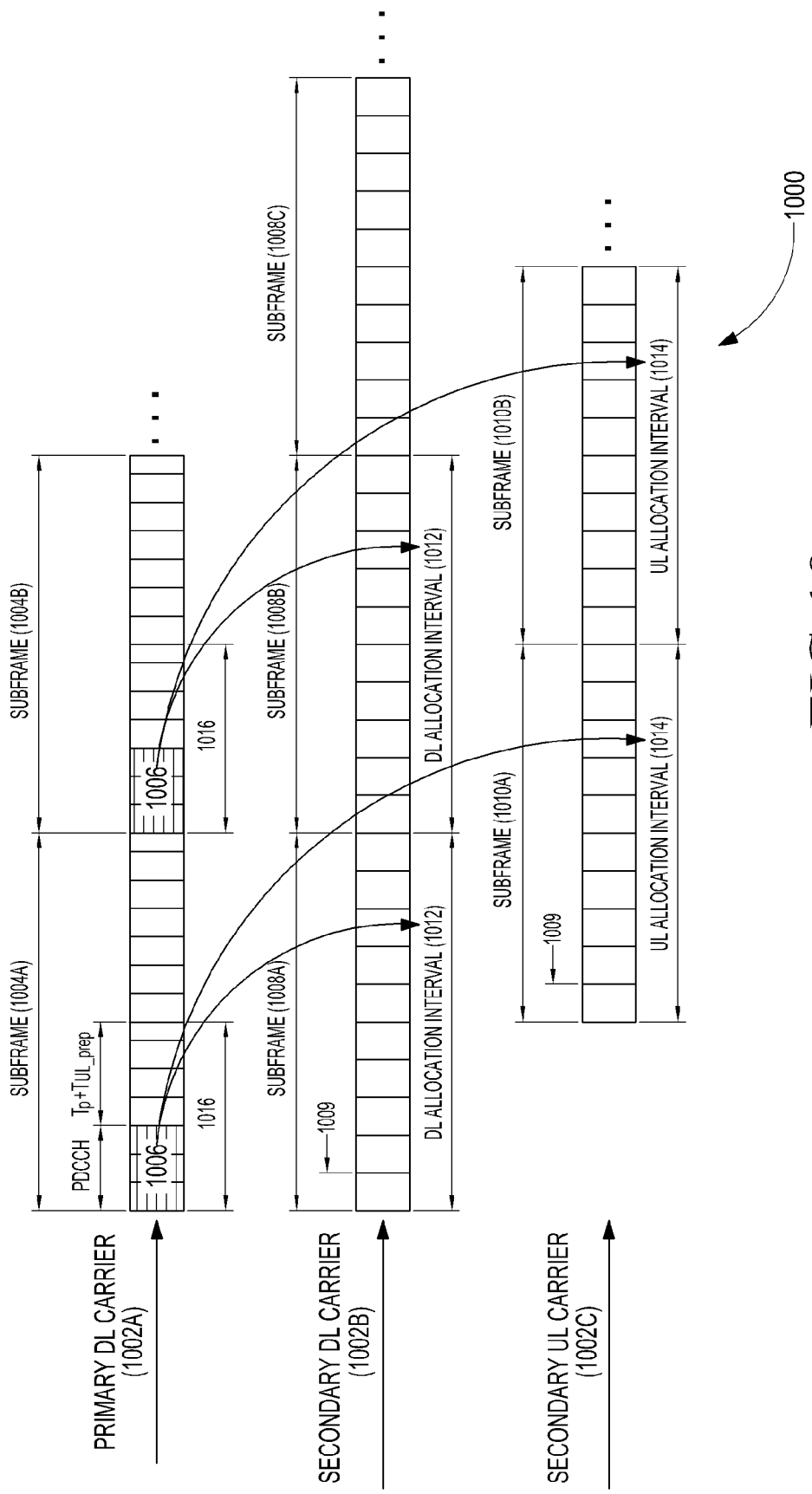
FIG. 10 illustrates a schematic representation of frame structures associated with a primary DL carrier, a secondary DL carrier, and a secondary UL carrier, according to yet another embodiment.

FIG. 10 illustrates a schematic representation 1000 of frame structures 1002A-1002C associated with a primary Downlink (DL) carrier, a secondary DL carrier, and a secondary uplink (UL) carrier, according to yet another embodiment. It can be seen from the schematic representation 1000 that the subframes 1008A-N of the secondary downlink carrier are time aligned with corresponding subframes of the primary downlink carrier. It can also be seen that the subframes 1010A-N of the secondary UL carrier are offset by pre-defined time duration 1016 with respect to the corresponding subframes 1004A-N of the primary DL carrier. The pre-defined offset 1016 may be equal to at least one of time duration of the PDCCH region 1006 in which resource allocation information is transmitted, time duration required for processing the resource allocation information, time duration required to switch from primary carrier to secondary carrier, time duration required to synchronize with the secondary carrier, time duration required to prepare uplink packet based on the resource allocation information, time duration required for uplink timing advance, and time duration required for beamforming.

As depicted, the DL allocation interval 1012 starts at the same time as the subframe 1008 of the secondary DL carrier. Also, the UL allocation interval 1014 starts at the same time as the subframe 1010 of the secondary UL carrier. It can be noted that duration of the DL allocation interval 1012 and the UL allocation interval 1014 is equal to one subframe duration. Alternatively, the duration of the DL allocation interval 1012 and the UL allocation interval 1014 can be more than one subframe duration.

Figure 11:
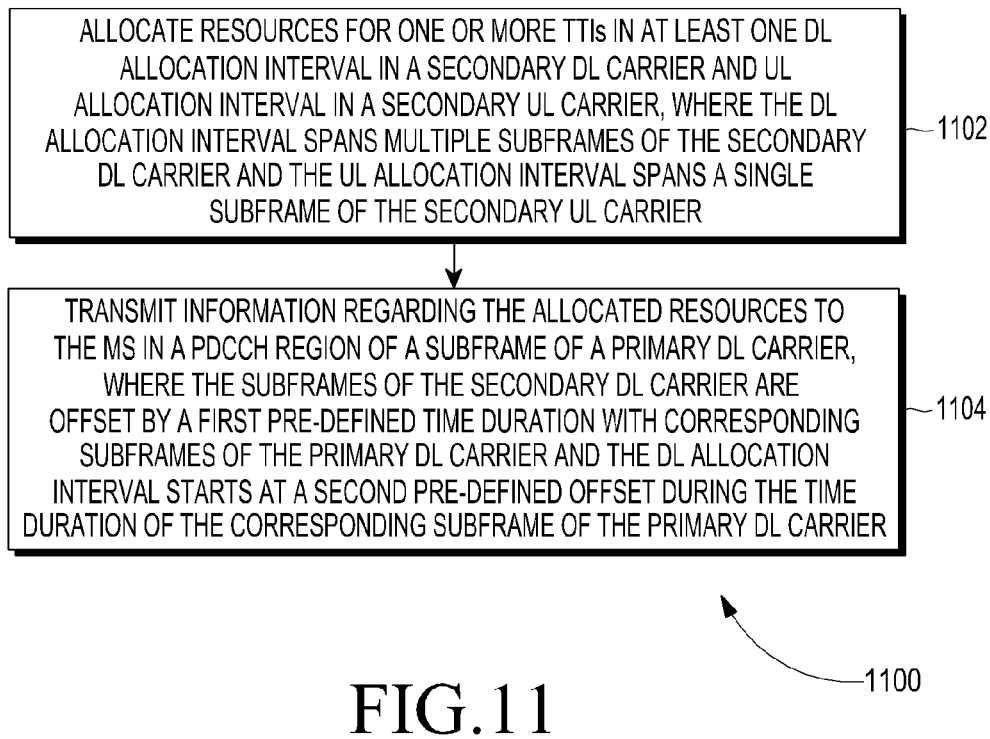
FIG. 11 illustrates a flowchart of an exemplary method of allocating resources to the MS, according to further another embodiment.

FIG. 11 illustrates a flowchart 1100 for an exemplary method of allocating resources to the MS 204, according to further another embodiment. At step 1102, resources for one or more transmit time intervals in at least one of DL allocation interval of a secondary DL carrier (e.g., SMB DL carrier) and UL allocation interval of a secondary UL carrier (e.g., SMB UL carrier) are allocated for the MS 204, where the DL allocation interval spans multiple subframes of the secondary DL carrier and the UL allocation interval spans a single subframe of the secondary UL carrier.

At step 1104, information regarding the allocated resources is transmitted to the MS 204 in a PDCCH region of a subframe of a primary DL carrier. It can be noted that, the subframes of the secondary DL carrier is time aligned with the subframes of the primary DL carrier whereas the subframes of the secondary UL carrier are offset by a first pre-defined time duration with corresponding subframes of the primary DL carrier. Further, the DL allocation interval starts at a second pre-defined offset during the time duration of the corresponding subframe of the primary DL carrier in which the resource allocation information for the DL allocation interval is transmitted. On the other hand, the UL allocation interval in the secondary UL carrier starts at the same time as the subframe of the secondary UL carrier which starts at the first pre-defined offset from the subframe of the primary DL carrier in which the resource allocation information for the UL allocation interval is transmitted.

Figure 12:
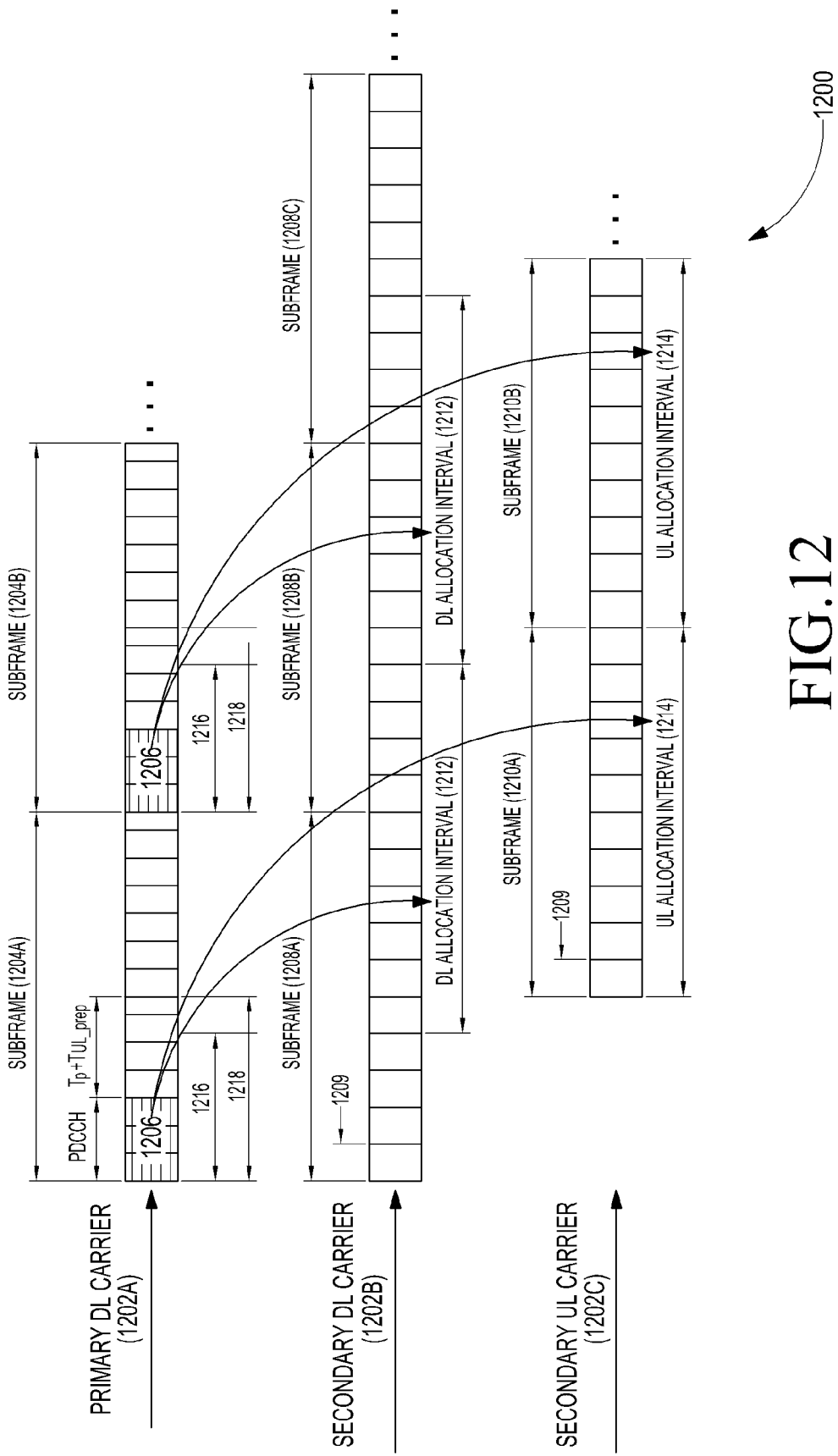
FIG. 12 illustrates a schematic representation of frame structures associated with a primary DL carrier, a secondary DL carrier, and a secondary UL carrier, according to further another embodiment.

FIG. 12 illustrates a schematic representation 1200 of frame structures 1202A-1202C associated with a primary Downlink (DL) carrier, a secondary DL carrier, and a secondary uplink (UL) carrier, according to further another embodiment. It can be seen that the schematic representation 1200 is similar to the schematic representation 1000 of FIG. 10 except the DL allocation interval 1212 spans multiple subframes of the secondary DL carrier. For example, the DL allocation interval 1212 spans the subframes 1208A and 1208B of the secondary DL carrier. That is, the DL allocation interval 1212 starts at a predefined offset 1216 during time duration of the subframe 1204 of the primary DL carrier in which the resource allocation information for said DL allocation interval 1212 is transmitted. The predefined offset 1218 is equal to at least one of time duration of the PDCCH region 1206 in which resource allocation information is transmitted, time duration required for processing the resource allocation information, time duration required to switch from primary carrier to secondary carrier, time duration require to synchronize with the secondary carrier, and time duration required for beamforming.

Figure 13:
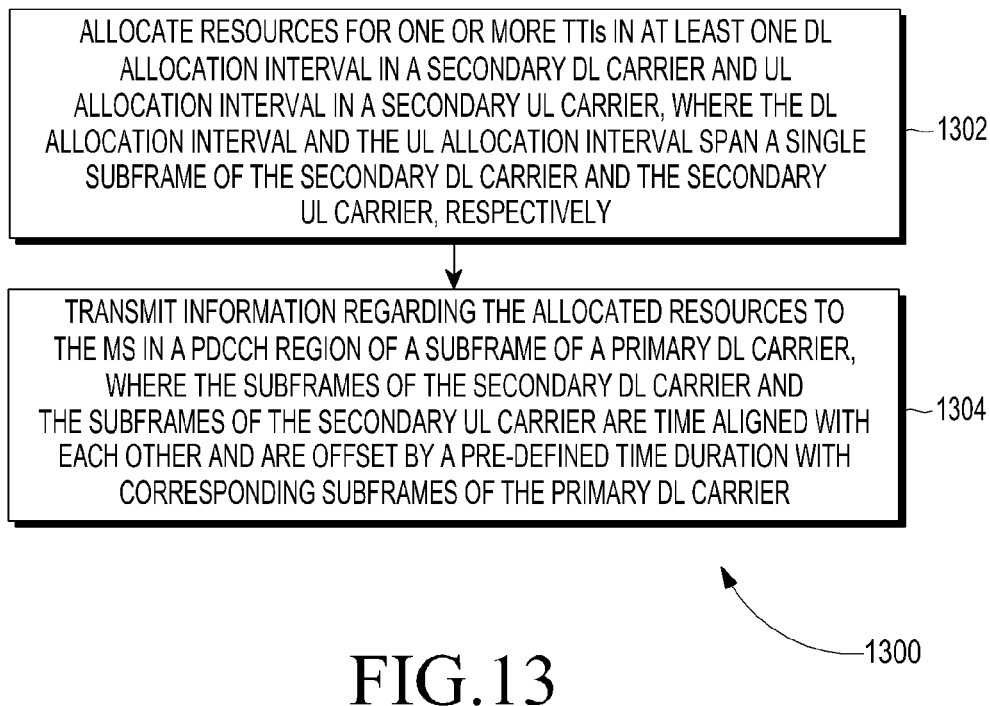
FIG. 13 illustrates a flowchart for an exemplary method of allocating resources to the MS, according to yet a further embodiment.

FIG. 13 illustrates a flowchart 1300 for an exemplary method of allocating resources to the MS 204, according to yet a further embodiment. At step 1302, resources for one or more transmit time intervals in at least one of DL allocation interval of a secondary DL carrier (e.g., SMB DL carrier) and UL allocation interval of a secondary UL carrier (e.g., SMB UL carrier) are allocated for the MS 204, where the DL allocation interval and the UL allocation interval span a single subframe of the secondary DL carrier and the secondary UL carrier, respectively.

At step 1304, information regarding the allocated resources is transmitted to the MS 204 in a PDCCH region of a subframe of a primary DL carrier. It can be noted that, the subframes of the secondary DL carrier and the subframes of the secondary UL carrier are time aligned with each other and are offset by a pre-defined time duration with corresponding subframes of the primary DL carrier. Further, the DL allocation interval in the secondary DL carrier starts at the same time as the subframe of the secondary DL carrier which starts at the pre-defined offset from the corresponding subframe of the primary DL carrier in which the resource allocation information for the DL allocation interval is transmitted. Similarly, the UL allocation interval in the secondary UL carrier starts at the same time as the subframe of the secondary UL carrier which starts at the pre-defined offset from the subframe of the primary DL carrier in which the resource allocation information for the UL allocation interval is transmitted.

Figure 14:
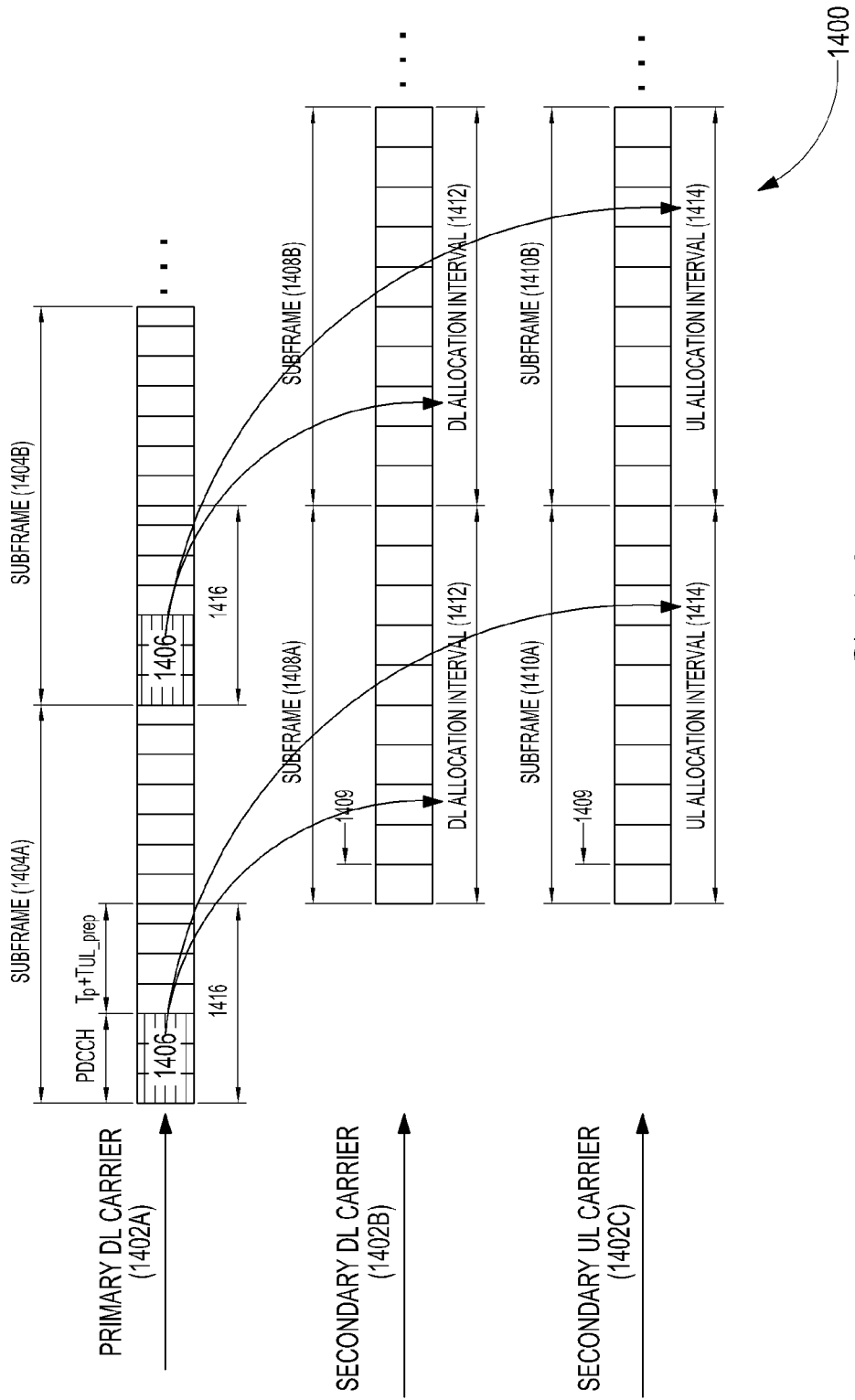
FIG. 14 illustrates a schematic representation of frame structures associated with a primary DL carrier, a secondary DL carrier, and a secondary UL carrier, according to yet a further embodiment.

FIG. 14 illustrates a schematic representation 1400 for frame structures 1402A-1402C associated with a primary Downlink (DL) carrier, a secondary DL carrier, and a secondary uplink (UL) carrier, according to yet a further embodiment. In FIG. 14, subframes 1408A-N of the secondary DL carrier and subframes 1410A-N of the secondary UL carrier are time aligned with each other and offset by pre-defined time duration 1416 with corresponding subframes 1404A-N of the primary DL carrier. The pre-defined offset 1416 is equal to at least one of time duration of the PDCCH region 1406 in which resource allocation information is transmitted, time duration required for processing the resource allocation information, time duration required to switch from primary carrier to secondary carrier, time duration required to synchronize with the secondary carrier, time duration required for preparing UL packet and time required to perform beamforming. Alternatively, the pre-defined offset 1416 may be equal to time duration of the PDCCH region 1406 in which resource allocation information is transmitted plus time duration required for processing the resource allocation information plus maximum of time duration required to switch from primary carrier to secondary carrier, time duration required to synchronize with the secondary carrier, time duration required for preparing UL packet, time required to perform beamforming and time duration required for uplink timing advance. In some embodiments, maximum timing advance supported by the asymmetric multicarrier system may be considered to calculate the pre-defined offset.

Further, it can be seen that, DL allocation interval 1412 in the secondary DL carrier and is time aligned with subframes 1408A-N of the secondary DL carrier. Similarly, UL allocation interval 1414 in the secondary DL carrier is time aligned with the subframes 1410A-N of the secondary UL carrier. It can also be noted that, duration of the DL allocation interval 1412 and the UL allocation interval 1414 is equal to single subframe duration. Alternatively, the duration of the DL allocation interval 1012 and the UL allocation interval 1014 may be greater than one subframe duration.

Figure 15:
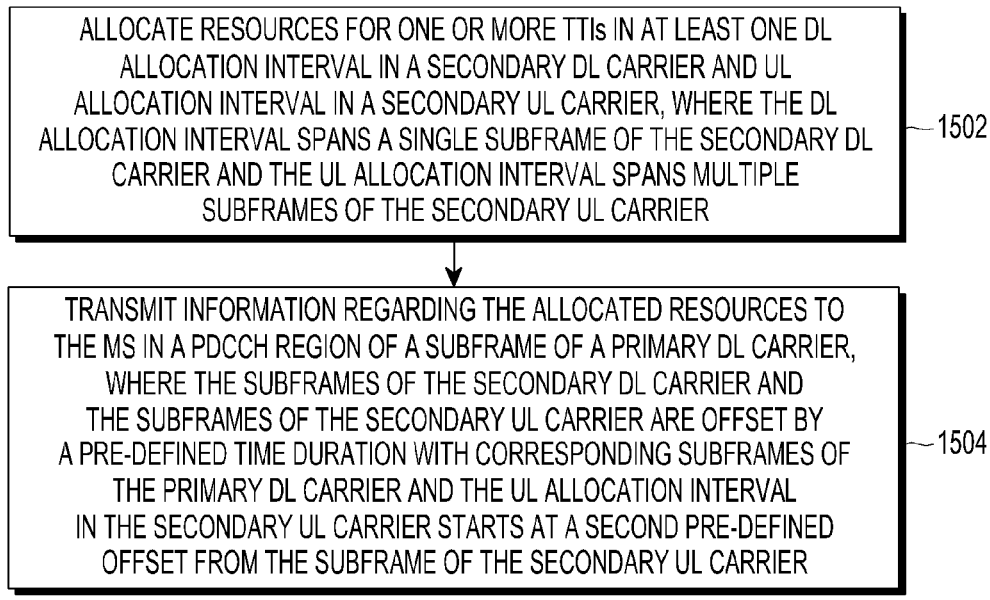
FIG. 15 illustrates a flowchart of an exemplary method of allocating resources to the MS, according to still another embodiment.

FIG. 15 illustrates a flowchart 1500 for an exemplary method of allocating resources to the MS 204, according to still another embodiment. At step 1502, resources for one or more transmit time intervals in at least one of DL allocation interval of a secondary DL carrier (e.g., SMB DL carrier) and UL allocation interval of a secondary UL carrier (e.g., SMB UL carrier) are allocated for the MS 204, where the DL allocation interval spans a single subframe of the secondary DL carrier and the UL allocation interval spans multiple subframes of the secondary UL carrier.

At step 1504, information regarding the allocated resources is transmitted to the MS 204 in a PDCCH region of a subframe of a primary DL carrier. It can be noted that, the subframes of the secondary DL carrier and the subframes of the secondary UL carrier are time aligned with each other and are offset by a first pre-defined time duration with corresponding subframes of the primary DL carrier. Further, the DL allocation interval in the secondary DL carrier starts at the same time as the subframe of the secondary DL carrier which starts at the pre-defined offset from the corresponding subframe of the primary DL carrier in which the resource allocation information for the DL allocation interval is transmitted. On the other hand, the UL allocation interval in the secondary UL carrier starts at a second predefined offset from the subframe of the secondary UL carrier which starts at the first pre-defined offset from the subframe of the primary DL carrier in which the resource allocation information for the UL allocation interval is transmitted.

Figure 16:
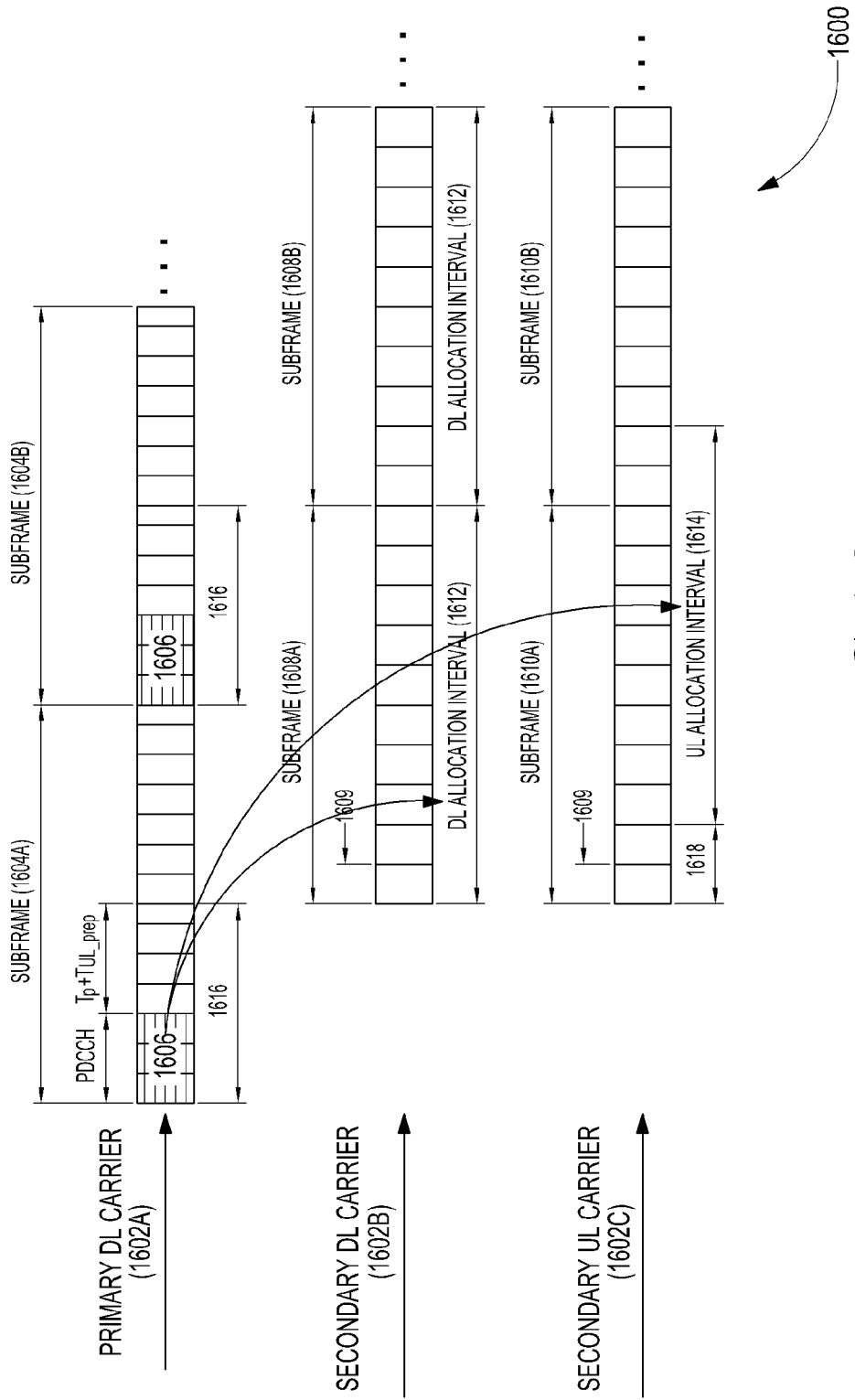
FIG. 16 illustrates a schematic representation of frame structures associated with a primary DL carrier, a secondary DL carrier, and a secondary UL carrier, according to still another embodiment.

FIG. 16 illustrates a schematic representation 1600 for frame structures 1602A-1602C associated with a primary Downlink (DL) carrier, a secondary DL carrier, and a secondary uplink (UL) carrier, according to still another embodiment. It can be seen that the schematic representation 1600 is similar to the schematic representation 1400 of FIG. 14, except that UL allocation interval 1614 starts at a predefined offset 1618 from the corresponding subframes 1610A-N of the secondary UL carrier. In one embodiment, the predefined offset 1618 is equal to time duration required to build an uplink packet. In another embodiment, the predefined offset 1618 is equal to time duration required to build an uplink packet minus time duration required to switch and synchronize to secondary carrier and time duration required to perform beamforming. The predefined offset is calculated as described above when the predefined offset 1616 is computed using time duration required to switch and synchronize to secondary carrier and time duration required to perform beamforming. Also, the predefined offset 1616 may include time duration required for uplink timing advance. In one exemplary implementation, maximum timing advance supported by the asymmetric multicarrier system may be considered to compute the pre-defined offset. As depicted in FIG. 16, the UL allocation interval 1614 spans multiple subframes of the secondary UL carrier. It can also be seen that subframes 1608A-N of the secondary DL carrier and subframes 1610A-N of the secondary UL carrier are time aligned with each other and offset by pre-defined time duration 1616 with corresponding subframes 1604A-N of the primary DL carrier. The pre-defined time duration 1616 is equal to at least one of time duration of the PDCCH region 1606 in which resource allocation information is transmitted, time duration required for processing the resource allocation information, time duration required to switch from primary carrier to secondary carrier time duration required to synchronize with the secondary carrier, and time required to perform beamforming.

Figure 17:
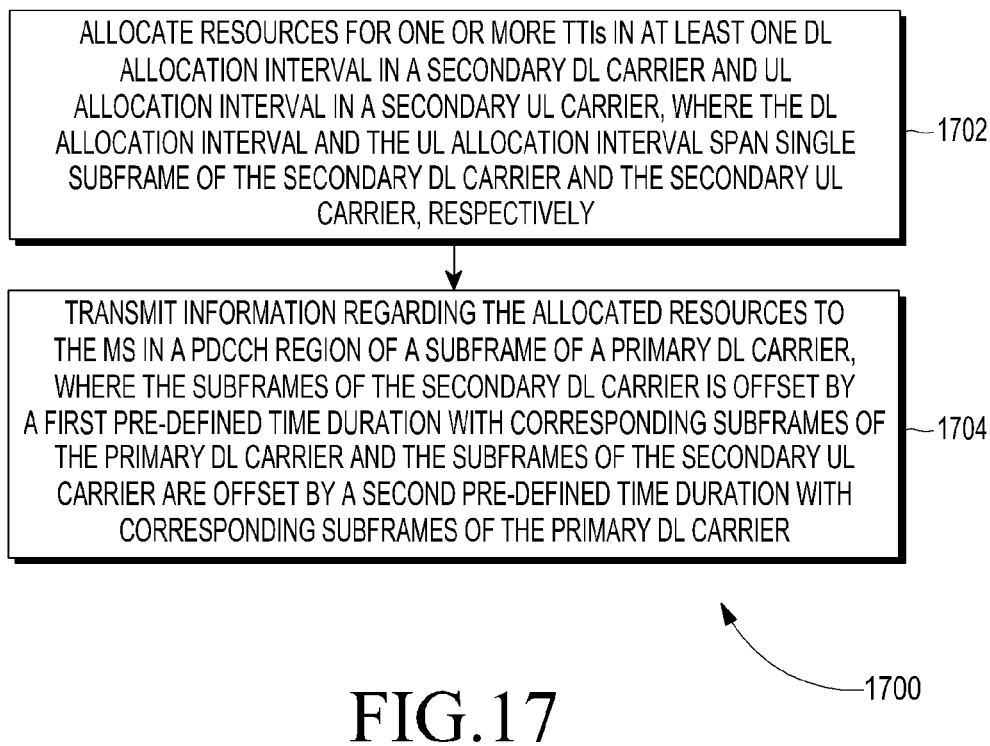
FIG. 17 illustrates a flowchart for an exemplary method of allocating resources to the MS, according to yet another embodiment.

FIG. 17 illustrates a process flowchart 1700 for an exemplary method of allocating resources to the MS 204, according to yet another embodiment. At step 1702, resources for one or more transmit time intervals in at least one of DL allocation interval of a secondary DL carrier (e.g., SMB DL carrier) and UL allocation interval of a secondary UL carrier (e.g., SMB UL carrier) allocated for the MS 204, where the DL allocation interval and the UL allocation interval span single subframe of the secondary DL carrier and the secondary UL carrier, respectively.

At step 1704, information regarding the allocated resources is transmitted to the MS 204 in a PDCCH region of a subframe of a primary DL carrier. It can be noted that, the subframes of the secondary DL carrier is offset by a first pre-defined time duration with corresponding subframes of the primary DL carrier. Similarly, the subframes of the secondary UL carrier are offset by a second pre-defined time duration with corresponding subframes of the primary DL carrier. Further, the DL allocation interval in the secondary DL carrier starts at the same time as the subframe of the secondary DL carrier which starts at the first pre-defined offset from the corresponding subframe of the primary DL carrier in which the resource allocation information for the DL allocation interval is transmitted. Similarly, the UL allocation interval in the secondary UL carrier starts at the same time as the subframe of the secondary UL carrier which starts at the second pre-defined offset from the subframe of the primary DL carrier in which the resource allocation information for the UL allocation interval is transmitted.

Figure 18:
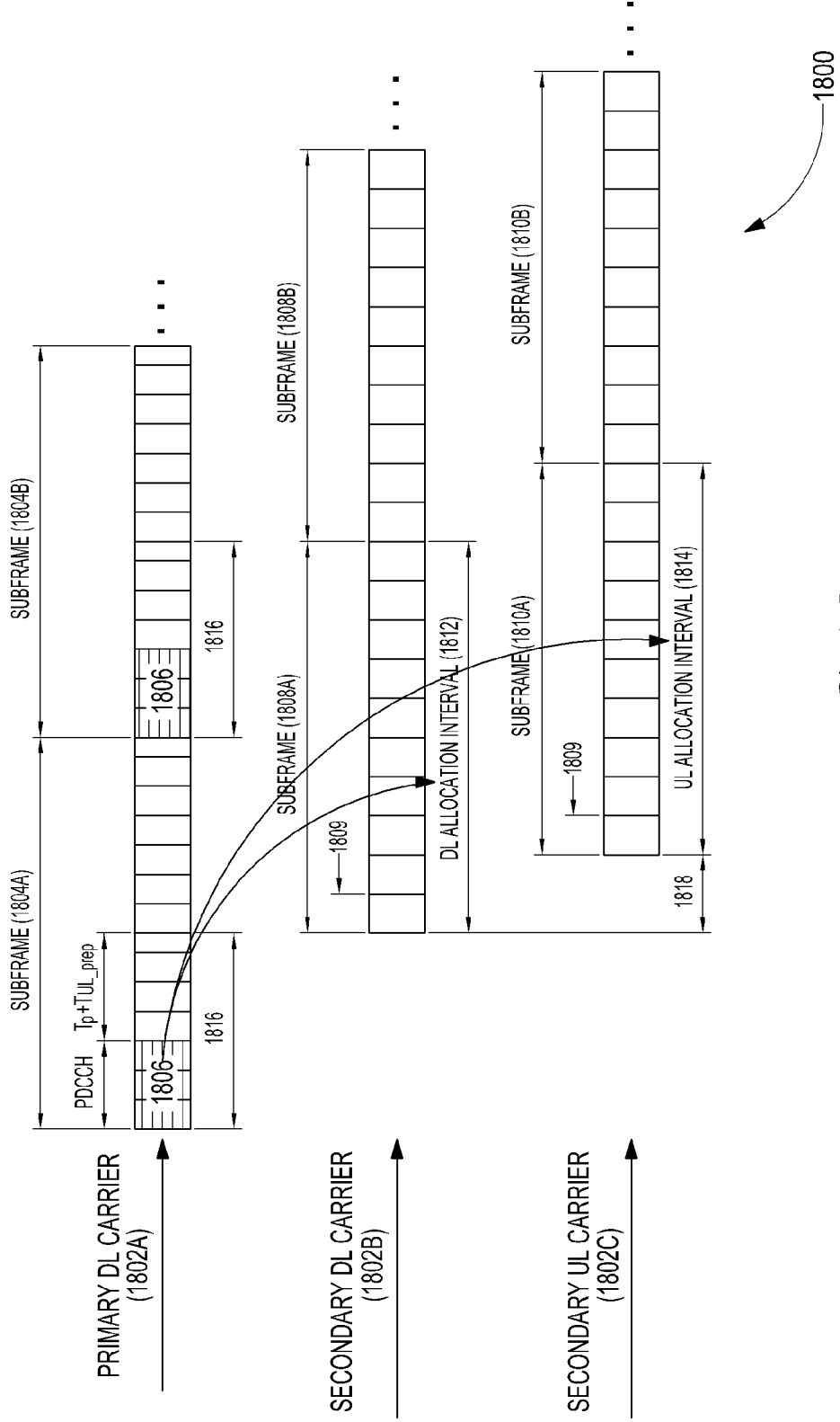
FIG. 18 illustrates a schematic representation of frame structures associated with a primary DL carrier, a secondary DL carrier, and a secondary UL carrier, according to yet another embodiment.

FIG. 18 illustrates a schematic representation 1800 of frame structures 1802A-1802C associated with a primary Downlink (DL) carrier, a secondary DL carrier, and a secondary uplink (UL) carrier, according to yet another embodiment. It can be seen that the schematic representation 1800 is similar to the schematic representation 1400 of FIG. 14, except that subframes 1810A-N of the secondary UL carrier are offset by predefined time duration 1818 with the corresponding subframes 1804A-N of the primary DL carrier. In one embodiment, the predefined offset 1818 is equal to time duration required to build an uplink packet. In another embodiment, the predefined offset 1818 is equal to time duration required to build an uplink packet minus time duration required to switch and synchronize to secondary carrier and time duration required to perform beamforming. The predefined offset 1818 is calculated as described above when the predefined offset 1816 is computed using time duration required to switch and synchronize to secondary carrier and time duration required to perform beamforming. Also, the predefined offset 1816 may include time duration required for uplink timing advance. In one exemplary implementation, maximum timing advance supported by the asymmetric multicarrier system may be considered to compute the pre-defined offset. As depicted in FIG. 18, the UL allocation interval 1814 spans multiple subframes of the secondary UL carrier. It can be seen that subframes 1808A-N of the secondary DL carrier and subframes 1810A-N of the secondary UL carrier are time aligned with each other and offset by pre-defined time duration 1816 with corresponding subframes 1804A-N of the primary DL carrier. The pre-defined time duration 1816 is equal to at least one of time duration of the PDCCH region 1806 in which resource allocation information is transmitted, time duration required for processing the resource allocation information, time duration required to switch from primary carrier to secondary carrier time duration required to synchronize with the secondary carrier, and time required to perform beamforming. As depicted, UL allocation interval 1814 starts at the same time as the subframe of the secondary UL carrier.

Figure 19:
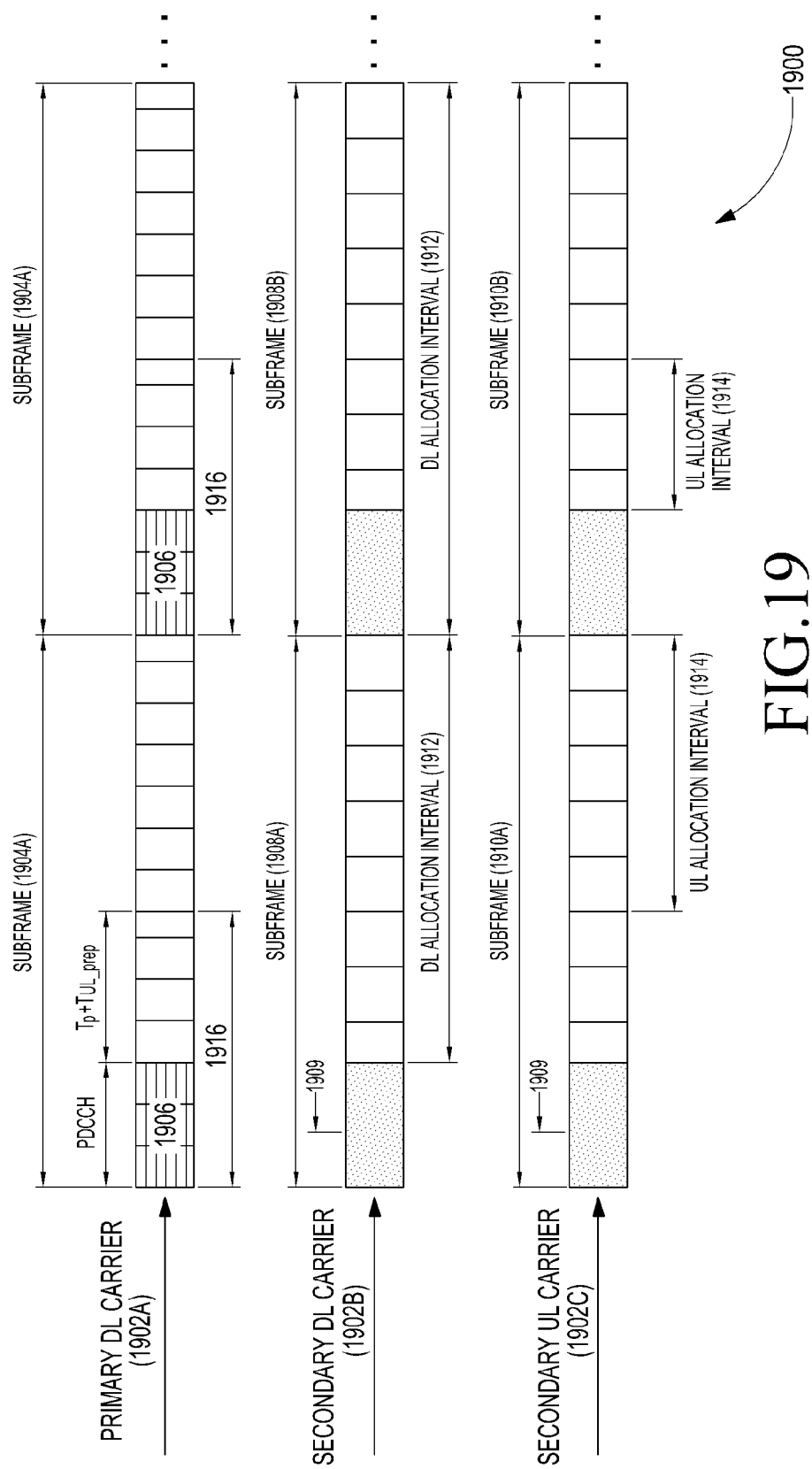
FIG. 19 illustrates a schematic representation of frame structures associated with a primary DL carrier, a secondary DL carrier, and a secondary carrier, according to another embodiment.

FIG. 19 illustrates a schematic representation 1900 of frame structures 1902A-1902C associated with a primary DL carrier, a secondary DL carrier, and a secondary UL carrier, according to another embodiment. It can be seen that the schematic representation 1900 is similar to the schematic representation 600 of FIG. 6, except that a DL allocation interval 1912 of the secondary DL carrier and an UL allocation interval 1914 of the secondary UL carrier do not comprise TTIs of a subframe which are overlapping the PDCCH region 1906 of a subframe (e.g., subframe 1904B) of the primary DL carrier. That is, TTIs in a subframe of the secondary DL carrier and the secondary UL carrier that overlap with time duration of the PDCCH region are unutilized especially when one radio frequency (RF) unit needs to be in ON state at a single instance. It can be noted that, the above condition is also applicable to the embodiments illustrated in FIGS. 5 to 18.

Figure 20:
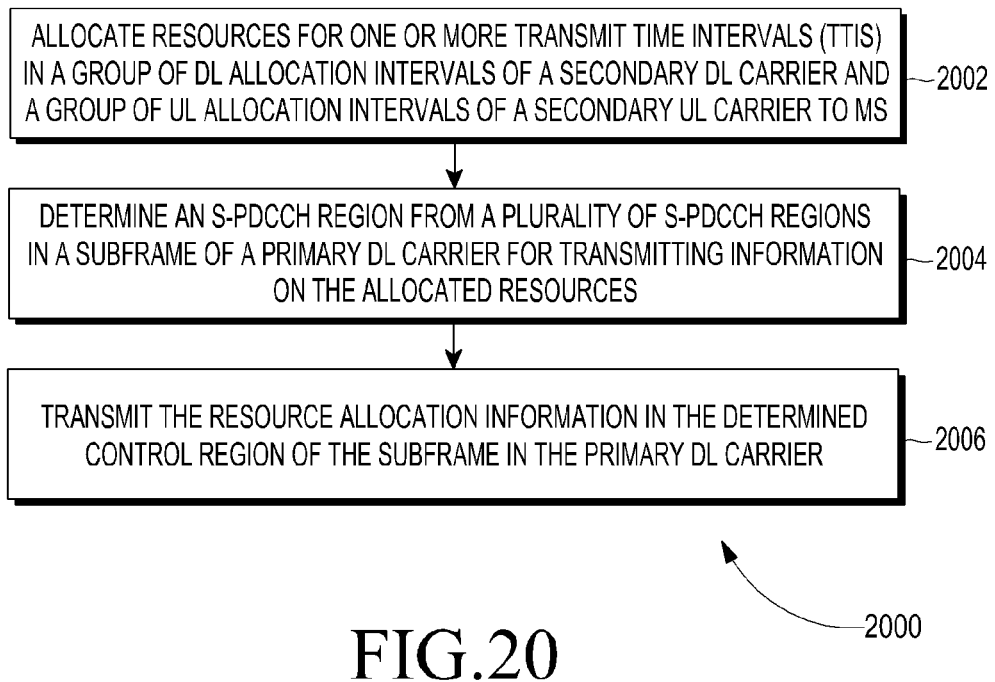
FIG. 20 illustrates a flowchart for an exemplary method of allocating resources to the MS, according to alternate embodiment.

FIG. 20 illustrates a flowchart 2000 for an exemplary method of allocating resources to the MS 204, according to alternate embodiment. At step 2002, resources for one or more transmit time intervals (TTIs) in a group of DL allocation intervals of a secondary DL carrier and a group of UL allocation intervals of a secondary UL carrier are allocated to the MS 204. The group of DL allocation intervals is contiguous. Also, the group of UL allocation intervals is contiguous.

At step 2004, an S-PDCCH region from a plurality of S-PDCCH regions in a subframe of a primary DL carrier is determined for transmitting information on the allocated resources. It can be noted that, each of the control regions is configured for carrying resource allocation information associated with one of the group of DL allocation intervals and one of the group of UL allocation intervals. At step 2006, the resource allocation information is transmitted in the determined control region of the subframe in the primary DL carrier.

Figure 21:
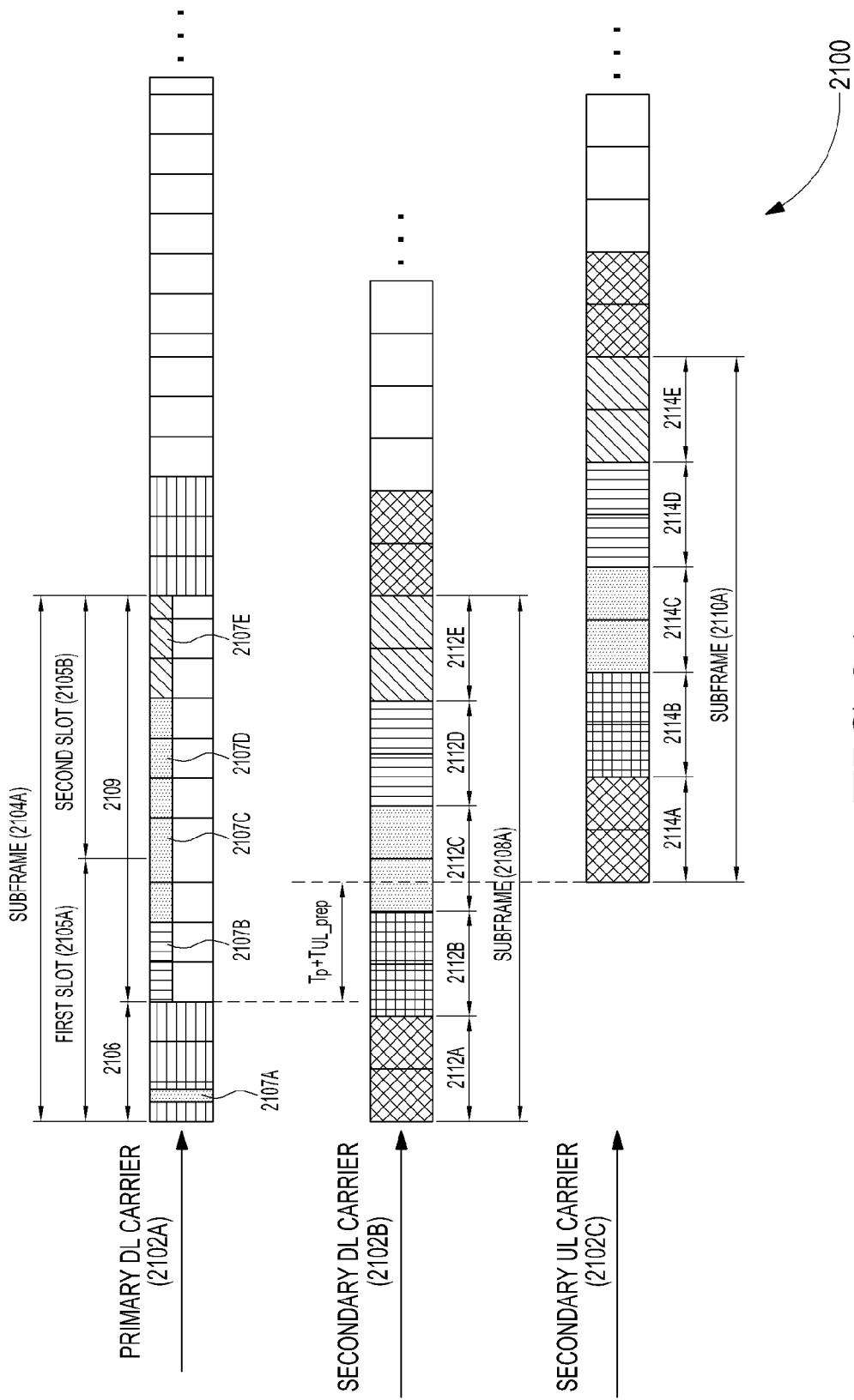
FIG. 21 illustrates a schematic representation of frame structures associated with a primary DL carrier, a secondary DL carrier, and a secondary UL carrier with multiple allocation intervals per subframe, according to one embodiment.

FIG. 21 illustrates a schematic representation 2100 for frame structures 2102A-2102C associated with a primary DL carrier, a secondary DL carrier, and a secondary UL carrier with multiple allocation intervals per subframe, according to one embodiment. The frame structure 2102A includes a plurality of subframes 2104A-N of 1 millisecond duration. Each of the subframes 2104A-N of the primary DL carrier is divided into two slots 2105A and 2105B. The first slot 2105A of the subframes 2104A-N contains a PDDCH region 2106 and a data region 2109 whereas the second slot 2105B includes the data region 2109. Multiple S-PDCCH regions 2107A-N are defined in each subframe of the primary DL carrier. The S-PDCCH region 2107A is located in the PDCCH region 2106 and the S-PDCCH regions 2107B-N are located in the data region 2109 in the first slot 2105A and the second slot 2105B. The S-PDCCH regions 2107A-N may be of same or different sizes.

The frame structure 2102B includes a plurality of subframes 2108A-N of 1 millisecond duration, each subframe 2108 of the secondary DL carrier is divided into multiple DL allocation intervals 2112A-N. Similarly, the frame structure 2102C includes a plurality of subframes 2110A-N, each subframe 2110 of the secondary UL carrier is divided into multiple UL allocation intervals 2114A-N. It can be noted that, number of S-PDCCH regions 2107A-N is equal to number of allocation intervals in one subframe duration (e.g., 1 ms). Each S-PDCCH region carries S-PDCCH for one DL allocation interval and one UL allocation interval. The mapping of S-PDCCH regions 2107A-N to DL allocation intervals 2112A-N and UL allocation interval 2114A-N are pre-defined by the BS 202. Alternatively, the mapping of S-PDCCH regions 2107A-N to DL allocation intervals 2112A-N and UL allocation interval 2114A-N is fixed.

In an embodiment illustrated in FIG. 21 the subframes 2108A-N of the secondary DL carrier are time aligned with the subframes 2104A-N of the primary DL carrier whereas the subframes 2110A-N of the secondary UL carrier are offset to the end of the first S-PDCCH region 2107B in the data region 2109 in the subframes 2104A-N by a time duration required for processing the resource allocation information and time duration required for preparing UL packet. In this embodiment, the DL allocation intervals 2112A-N and the UL allocation intervals 2114A-N are time aligned to boundary of the respective subframes 2108A-N and 2110A-N. In this case, there is a need to buffer data received on the DL allocation intervals 2112A-N. In another embodiment, the subframes 2110A-N of the secondary DL carrier are offset to the end of the first S-PDCCH region 2107B in the data region 2109 in the subframes 2104A-N by a time duration required for processing the resource allocation information by at least an amount equal to time duration required for processing the resource allocation information. In yet another embodiment, DL allocation intervals 2112A-N of the secondary DL carrier and UL allocation intervals 2114A-N are offset from end of the first S-PDCCH region 2107B in the data region 2109 of the subframes 2104A-N by an amount equal to a time duration required to process resource allocation information while subframes 2108A-N of the secondary DL carrier and subframes 2110A-N of the secondary UL carrier are time aligned with subframes 2104A-N of the primary DL carrier.

As illustrated in FIG. 21, the BS 202 transmits resource allocation information for the DL allocation interval 2112A and UL allocation interval 2114A in the S-PDCCH region 2107A, DL allocation interval 2112B and UL allocation interval 2114B in the S-PDCCH region 2107B, DL allocation interval 2112C and UL allocation interval 2114C in the S-PDCCH region 2107C, and DL allocation interval 2112D and UL allocation interval 2114D in the S-PDCCH region 2107D.

Figure 22:
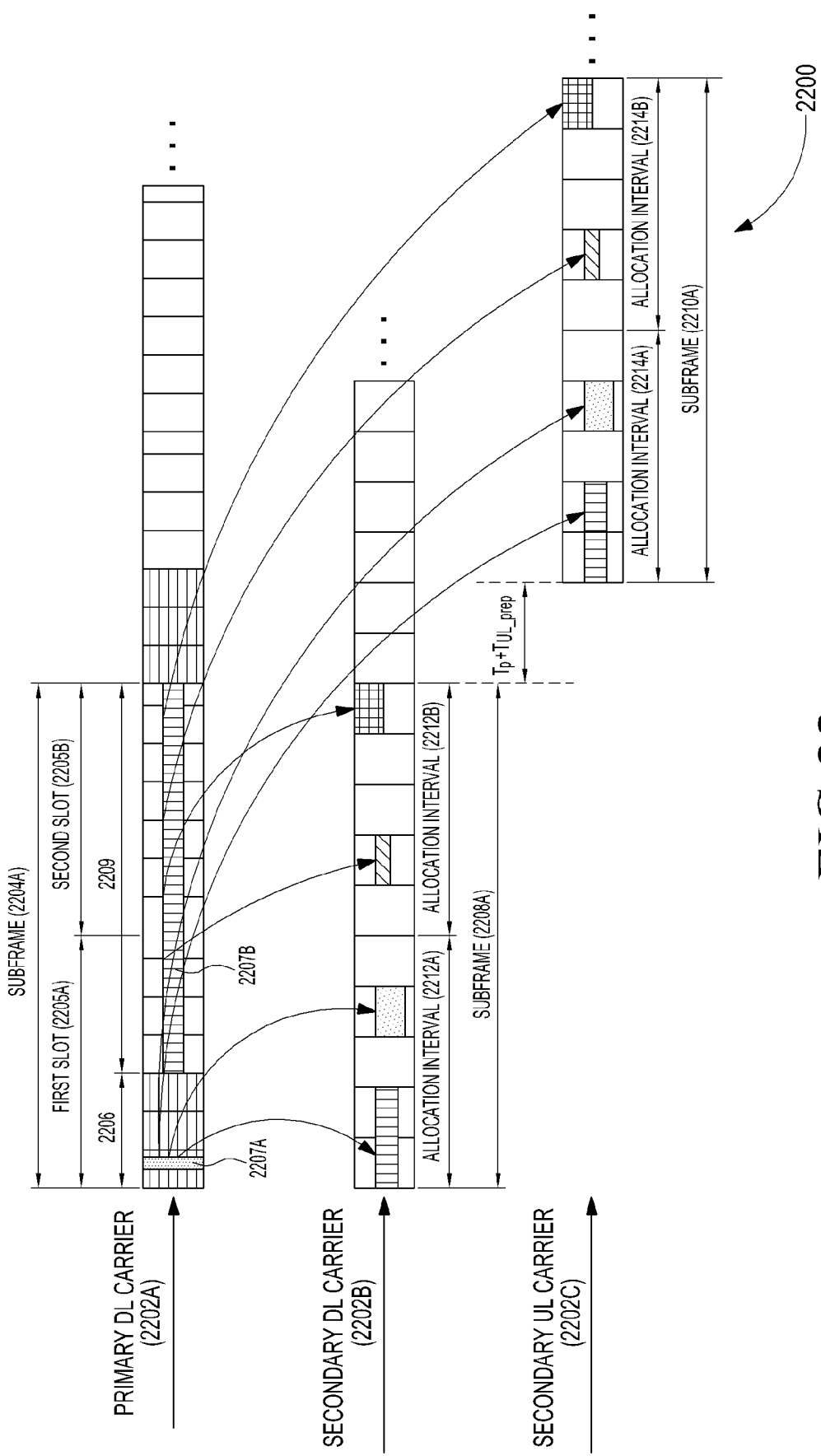
FIG. 22 illustrates a schematic representation of exemplary frame structures associated with a primary DL carrier, a secondary DL carrier, and a secondary UL carrier with two allocation intervals per subframe, according to one embodiment.

FIG. 22 illustrates a schematic representation 2200 of exemplary frame structures 2202A-2202C associated with a primary DL carrier, a secondary DL carrier, and a secondary UL carrier with two allocation intervals per subframe, according to one embodiment. The frame structure 2202A includes a plurality of subframes 2204A-N of 1 millisecond duration. Each of the subframes 2204A-N of the primary DL carrier is divided into two slots 2205A and 2205B. The first slot 2205A of the each subframe 2204 contains a PDDCH region 2206 and a data region 2209 whereas the second slot 2205B includes the data region 2209. The first S-PDCCH region 2207A is located in the PDCCH region 2206 and the second S-PDCCH region 2207B spans all symbols of the data region 2209 in the first slot 2205A and the second slot 2205B. The second S-PDCCH region 2207B is composed of same sub carriers in frequency domain for all symbols in the data region 2209.

The frame structure 2202B includes a plurality of subframes 2208A-N of 1 millisecond duration, each subframe 2208 of the secondary DL carrier is divided into two allocation intervals 2212A and 2212B. Similarly, the frame structure 2202C includes a plurality of subframes 2210A-N, each subframe 2210 of the secondary UL carrier is divided into two allocation intervals 2214A and 2214B. In an embodiment illustrated in FIG. 22, the subframes 2208A-N of the secondary DL carrier are time aligned with the subframes 2204A-N of the primary DL carrier whereas the subframes 2210A-N of the secondary UL carrier are offset to the end of the corresponding subframes 2204A-N of the primary DL carrier by a time duration required for processing the resource allocation information and time duration required for preparing UL packet. In another embodiment, the subframes 2210A-N of the secondary DL carrier are offset with respect to the corresponding subframes 2204A-N of the primary DL carrier such that the second allocation interval 2212B is offset to the end of the corresponding subframes 2204A-N of the primary DL carrier by at least an amount equal to time duration required for processing the resource allocation information.

According to the present disclosure, the base station 202 transmits information on allocated resources for the first allocation interval 2212A in the secondary DL carrier and the first allocation interval 2214A in the secondary UL carrier in the first S-PDCCH region 2207A. Similarly, the base station 202 transmits information on the allocated resources for the second allocation interval 2212B in the secondary DL carrier and the second allocation interval 2214B in the secondary UL carrier in the second S-PDCCH region 2207B.

Figure 23:
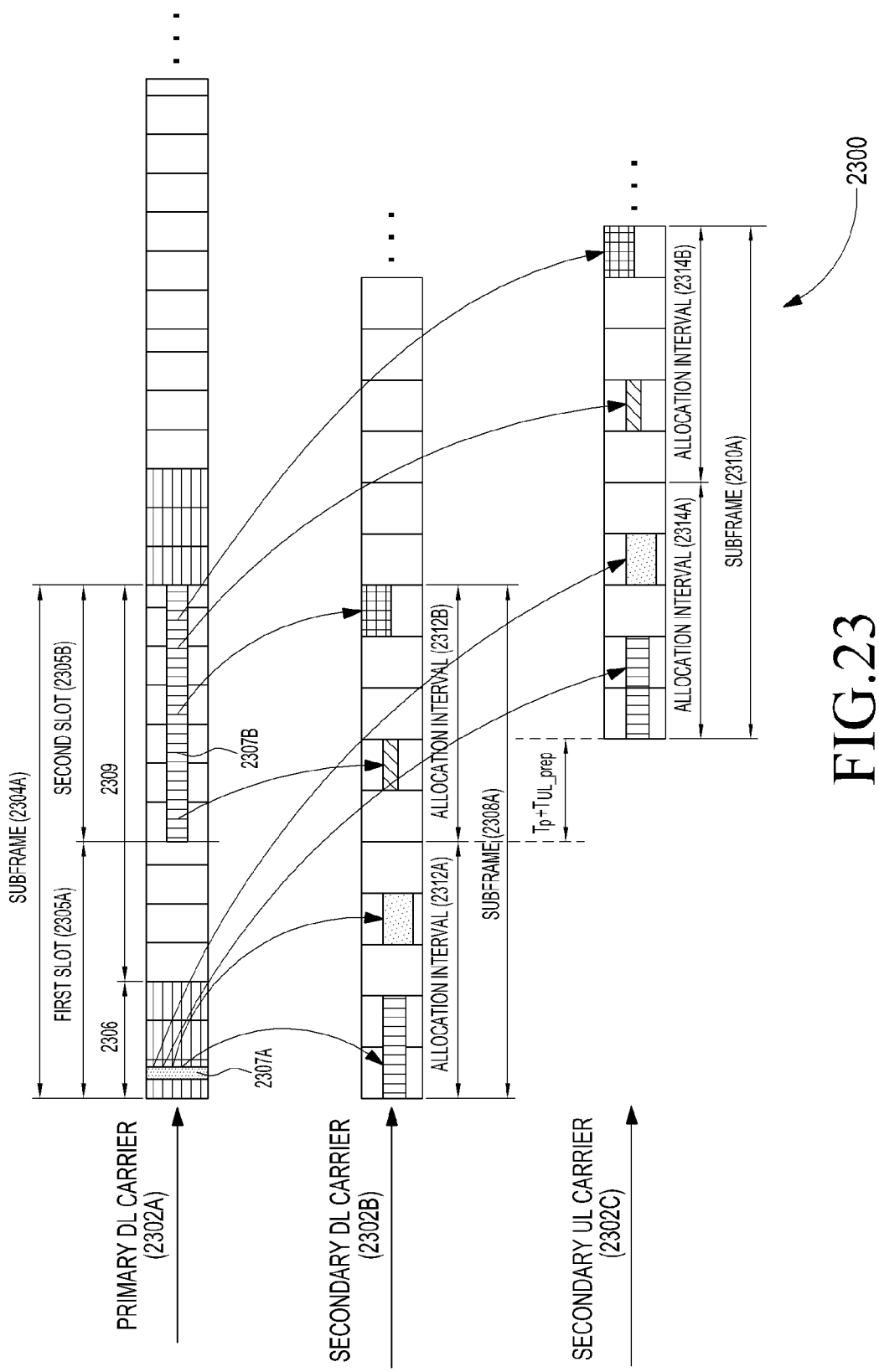
FIG. 23 illustrates a schematic representation of exemplary frame structures associated with a primary DL carrier, a secondary DL carrier, and a secondary UL carrier with two allocation intervals per subframe, according to another embodiment.

FIG. 23 illustrates a schematic representation 2300 of exemplary frame structures 2302A-2302C associated with a primary DL carrier, a secondary DL carrier, and a secondary UL carrier with two allocation intervals per subframe, according to another embodiment. It can be seen that, the schematic representation 2300 is similar to the schematic representation 2200 of FIG. 22, except that the first S-PDCCH region 2307A is located in the PDCCH region 2306 in the first slot 2305A and the second S-PDCCH region 2307B in the data region 2309 in the second slot 2305B of the subframes 2304A-N in the primary DL carrier. That is, the second S-PDCCH region 2307B spans all symbols of the second slot 2305B.

Also, the subframes 2308A-N of the secondary DL carrier are time aligned with the subframes 2304A-N of the primary DL carrier whereas the subframes 2310A-N of the secondary UL carrier are offset to the end of the first slot 2305A of the corresponding subframes 2304A-N of the primary DL carrier by a time duration required for processing the resource allocation information and time duration required for preparing UL packet. Further, the subframes 2310A-N of the secondary DL carrier are offset with respect from the first slot 2305A of the corresponding subframes 2304A-N of the primary DL carrier by at least an amount equal to time duration required for processing the resource allocation information.

Figure 24:
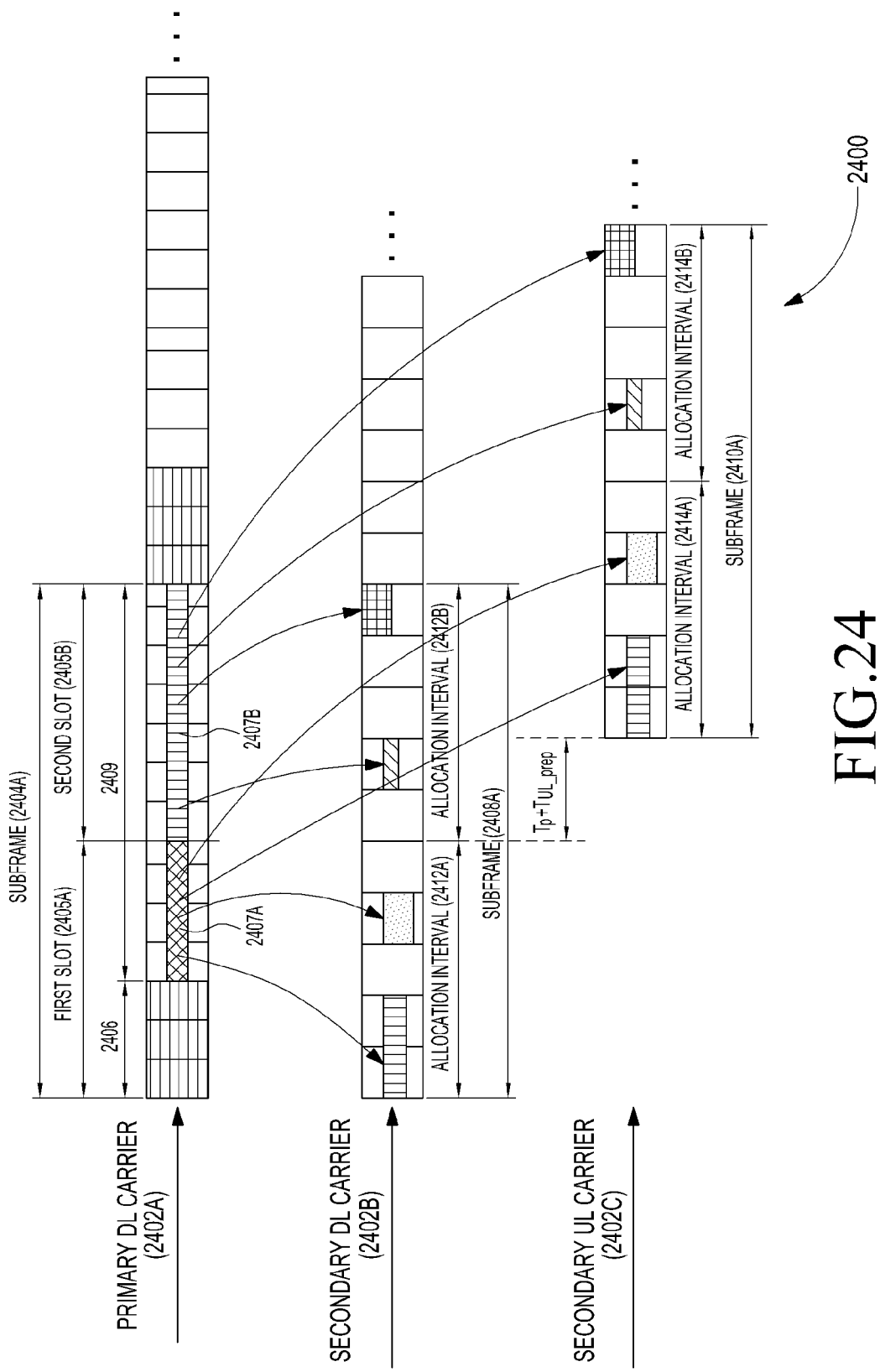
FIG. 24 illustrates a schematic representation of exemplary frame structures associated with a primary DL carrier, a secondary DL carrier, and a secondary UL carrier with two allocation intervals per subframe, according to yet another embodiment.

FIG. 24 illustrates a schematic representation 2400 of exemplary frame structures 2402A-2402C associated with a primary DL carrier, a secondary DL carrier, and a secondary UL carrier with two allocation intervals per subframe, according to yet another embodiment. It can be seen that, the schematic representation 2400 is similar to the schematic representation 2300 of FIG. 23, except that the first S-PDCCH region 2407A is located in the data region 2409 in the first slot 2405A instead of the PDCCH region 2406. That is, the first S-PDCCH region 2407A spans all symbols of the data region 2409 in the first slot 2405A and the second S-PDCCH region 2407B spans all symbols of the data region 2409 in the second slot 2405B. The first S-PDCCH region 2407A is composed of same sub carriers in frequency domain for all symbols in the data region 2409 of the first slot 2405A, Similarly, the second S-PDCCH region 2407B is composed of the same sub carriers as the first S-PDCCH region 2407A in frequency domain for all symbols. Alternatively, the second S-PDCCH region 2407B is composed of same sub carriers in frequency domain for all symbols in the data region 2409 in the second slot 2405B.

Figure 25:
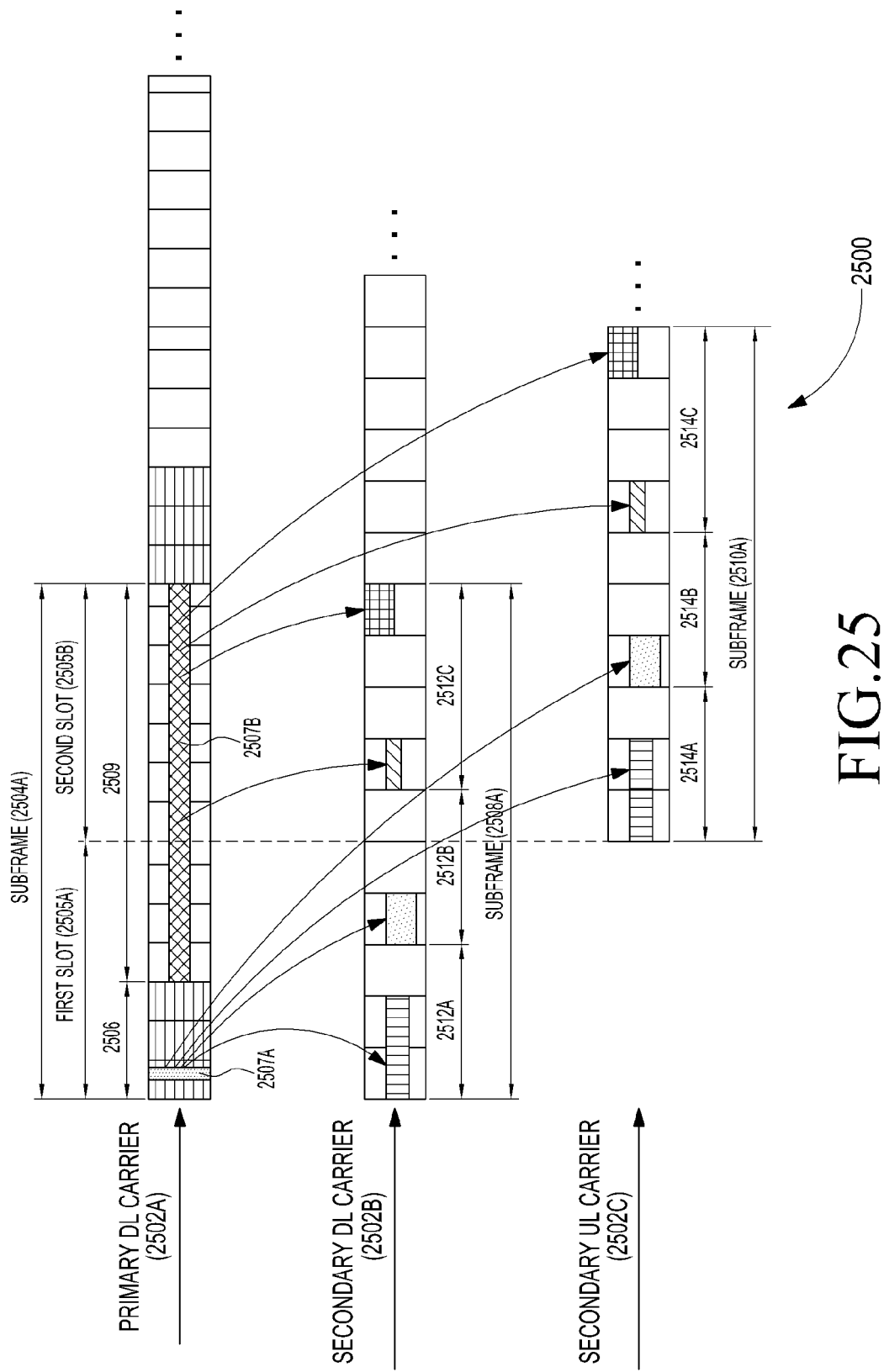
FIG. 25 illustrates a schematic representation of exemplary frame structures associated with a primary DL carrier, a secondary DL carrier, and a secondary UL carrier with three allocation intervals per subframe, according to one embodiment.

FIG. 25 illustrates a schematic representation 2500 of exemplary frame structures 2502A-2502C associated with a primary DL carrier, a secondary DL carrier, and a secondary UL carrier with three allocation intervals per subframe, according to one embodiment. The frame structure 2502A includes a plurality of subframes 2504A-N of 1 millisecond duration. Each of the subframes 2504A-N of the primary DL carrier is divided into two slots 2505A and 2505B. The first slot 2505A of the each subframe 2504 contains PDDCH region 2506 and data region 2509 whereas the second slot 2505B includes data region 2509. The first S-PDCCH region 2507A is located in the PDCCH region 2506 and second S-PDCCH region 2507B is located in the data region 2509 in the first slot 2505A. The third S-PDCCH region 2507C is located in the data region 2509 of the second slot 2505B. The second S-PDCCH region 2507B spans all symbols in the data region 2509 of the first slot 2505A. The second S-PDCCH region 2507B is composed on same sub carriers in frequency domain for all symbols in the data region 2509 of the first slot 2505A. The third S-PDCCH region 2507C spans all symbols of the second slot 2505B. The third S-PDCCH region 2507C is composed of same sub carriers in frequency domain for all symbols. In one embodiment, subcarriers for the second S-PDCCH region 2507B and the third S-PDCCH region 2507C are same. In another embodiment, subcarriers for the second S-PDCCH region 2507B and the third S-PDCCH region 2507C are different.

The frame structure 2502B includes a plurality of subframes 2508A-N of 1 millisecond duration, each subframe 2508 is divided into three allocation intervals 2512A, 2512B and 2512C. Similarly, the frame structure 2502C includes a plurality of subframes 2510A-N, each subframe 2210 is divided into three allocation intervals 2514A, 2514B and 2514C.

According to the present disclosure, the base station 202 transmits information on allocated resources for the first allocation interval 2512A in the secondary DL carrier and the first allocation interval 2514A in the secondary UL carrier in the first S-PDCCH region 2507A. Similarly, the base station 202 transmits information on the allocated resources for the second allocation interval 2512B in the secondary DL carrier and the second allocation interval 2514B in the secondary UL carrier in the second S-PDCCH region 2507B. Also, the base station 202 transmits information on the allocated resources for the third allocation interval 2512C in the secondary DL carrier and the third allocation interval 2514C in the secondary UL carrier in the third S-PDCCH region 2507C.

Figure 26:
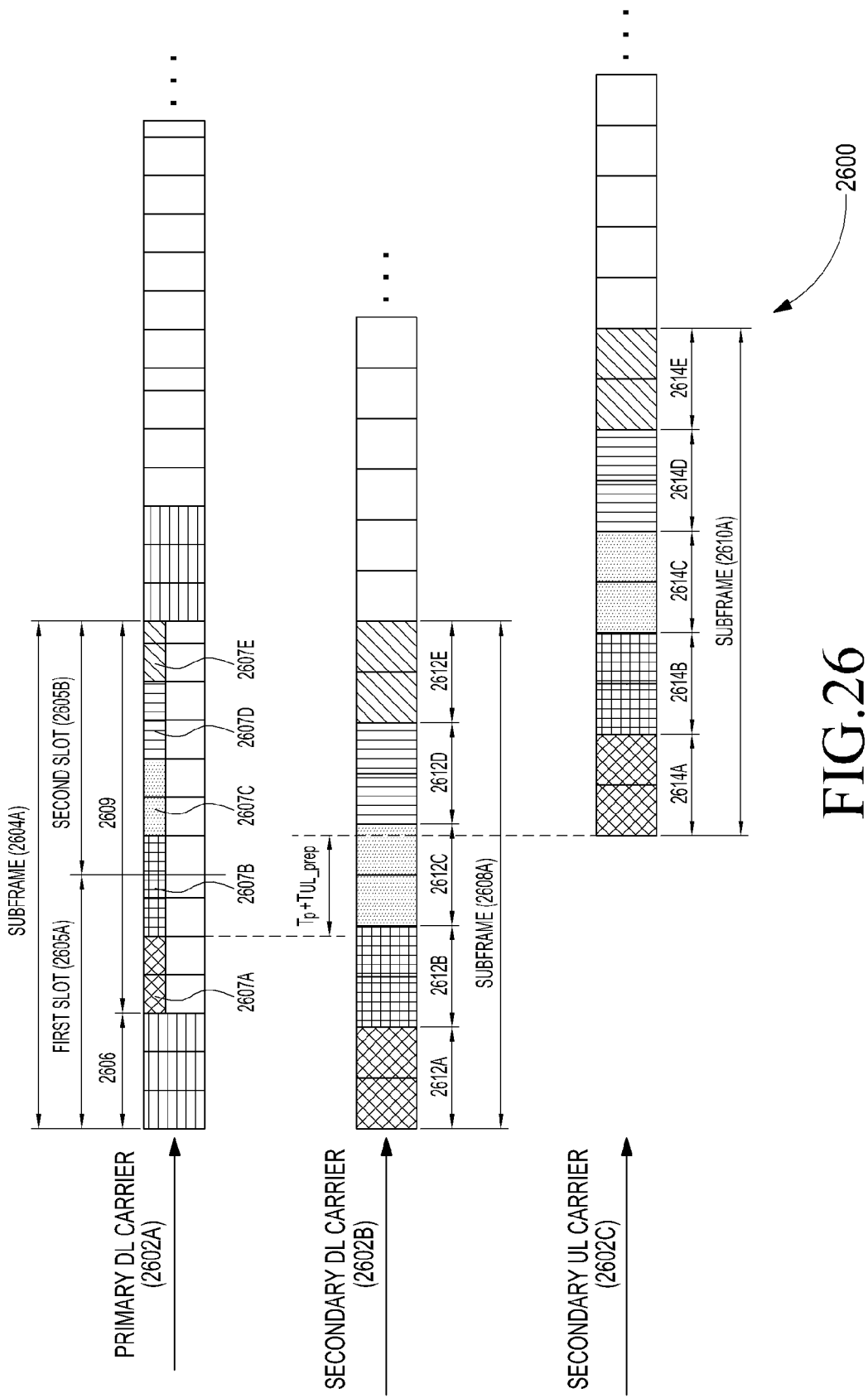
FIG. 26 illustrates a schematic representation of frame structures associated with a primary DL carrier, a secondary DL carrier, and a secondary UL carrier with multiple allocation intervals per subframe, according to another embodiment.

FIG. 26 illustrates a schematic representation 2600 of frame structures 2602A-2602C associated with a primary DL carrier, a secondary DL carrier, and a secondary UL carrier with multiple allocation intervals per subframe, according to another embodiment. It can be seen that, the schematic representation 2600 is similar to the schematic representation 2100 of FIG. 21, except that multiple S-PDCCH regions 2607A-N are located in data portion of subframe in the primary DL carrier.

Figure 27:
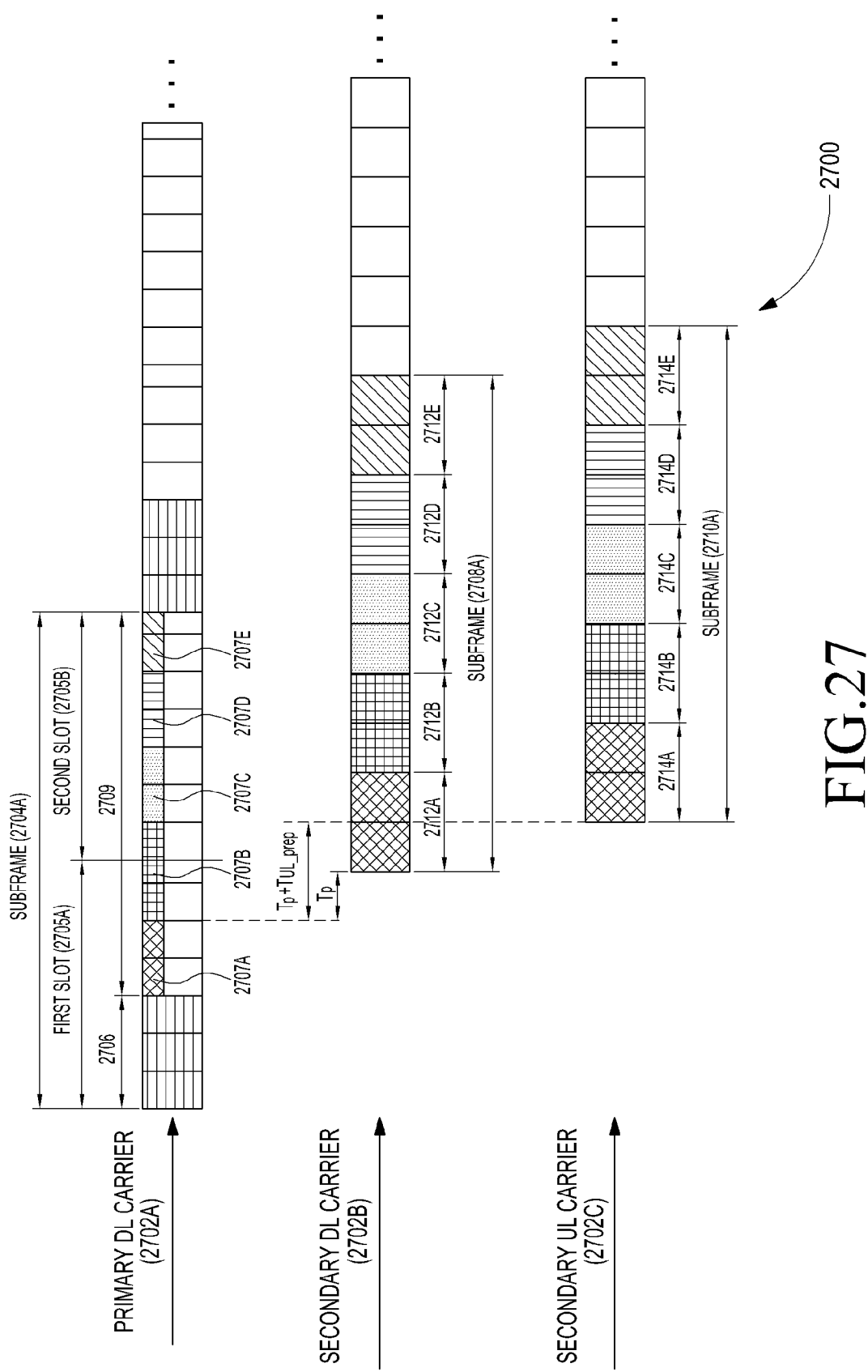
FIG. 27 illustrates a schematic representation of frame structures associated with a primary DL carrier, a secondary DL carrier, and a secondary UL carrier with multiple allocation intervals per subframe, according to yet another embodiment.

FIG. 27 illustrates a schematic representation 2700 of frame structures 2702A-2702C associated with a primary DL carrier, a secondary DL carrier, and a secondary UL carrier with multiple allocation intervals per subframe, according to another embodiment. It can be seen that, the schematic representation 2700 is similar to the schematic representation 2600 of FIG. 26, except that subframes 2708A-N of the secondary DL carrier is offset from end of a first S-PDCCH region 2707A by an amount equal to a time duration required to process resource allocation information.

Figure 28:
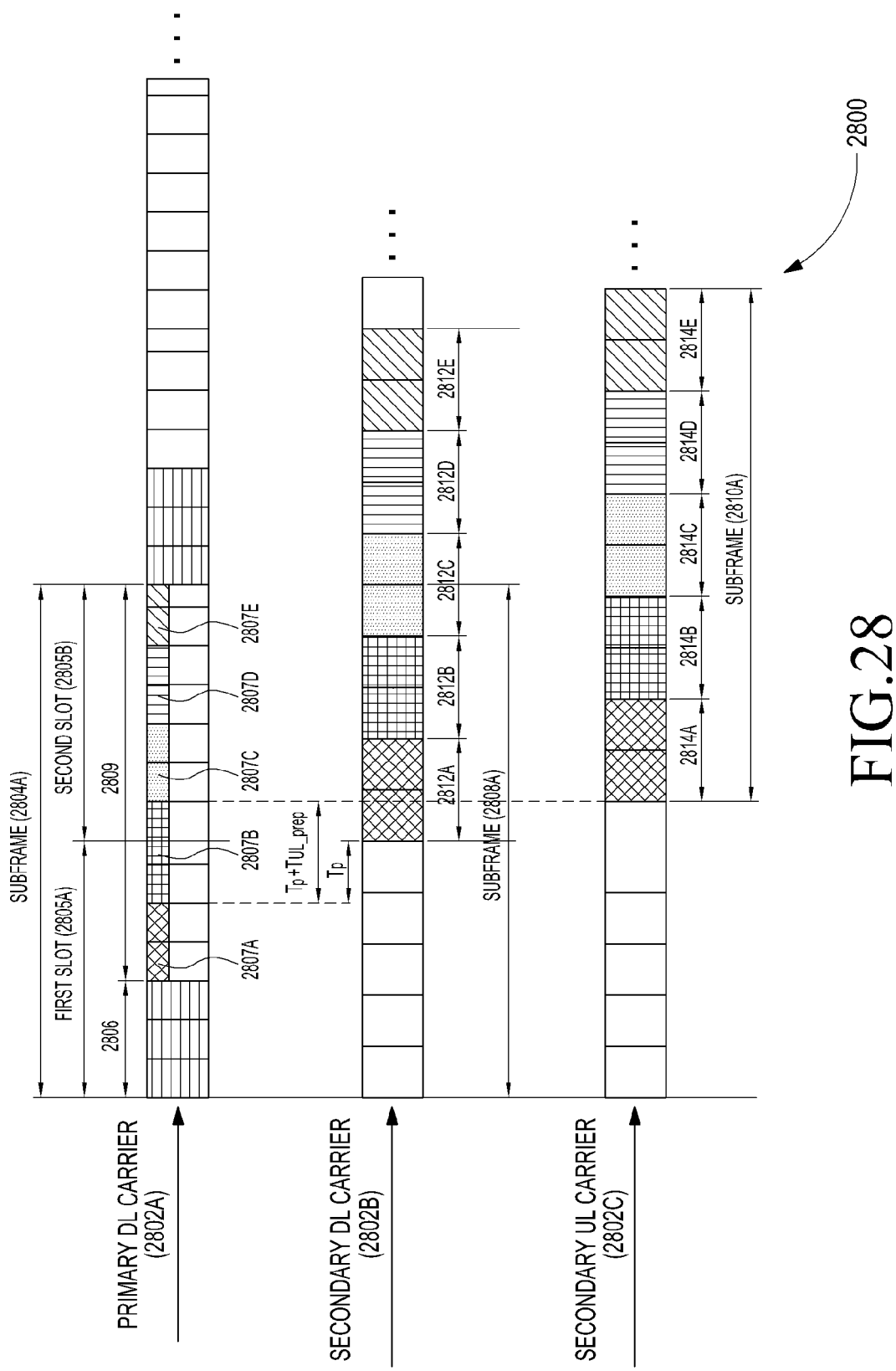
FIG. 28 illustrates a schematic representation of frame structures associated with a primary DL carrier, a secondary DL carrier, and a secondary UL carrier with multiple allocation intervals per subframe, according to further another embodiment.

FIG. 28 illustrates a schematic representation 2800 of frame structures 2802A-2802C associated with a primary DL carrier, a secondary DL carrier, and a secondary UL carrier with multiple allocation intervals per subframe, according to further another embodiment. It can be seen that, the schematic representation 2800 is similar to the schematic representation 2600 of FIG. 26, except that allocation intervals 2812A-N of the secondary DL carrier and allocation intervals 2814A-N are offset from end of a first S-PDCCH region 2807A by an amount equal to a time duration required to process resource allocation information while subframes 2808A-N of the secondary DL carrier and subframes 2810A-N of the secondary UL carrier are time aligned with subframes 2804A-N of the primary DL carrier.

Figure 29:
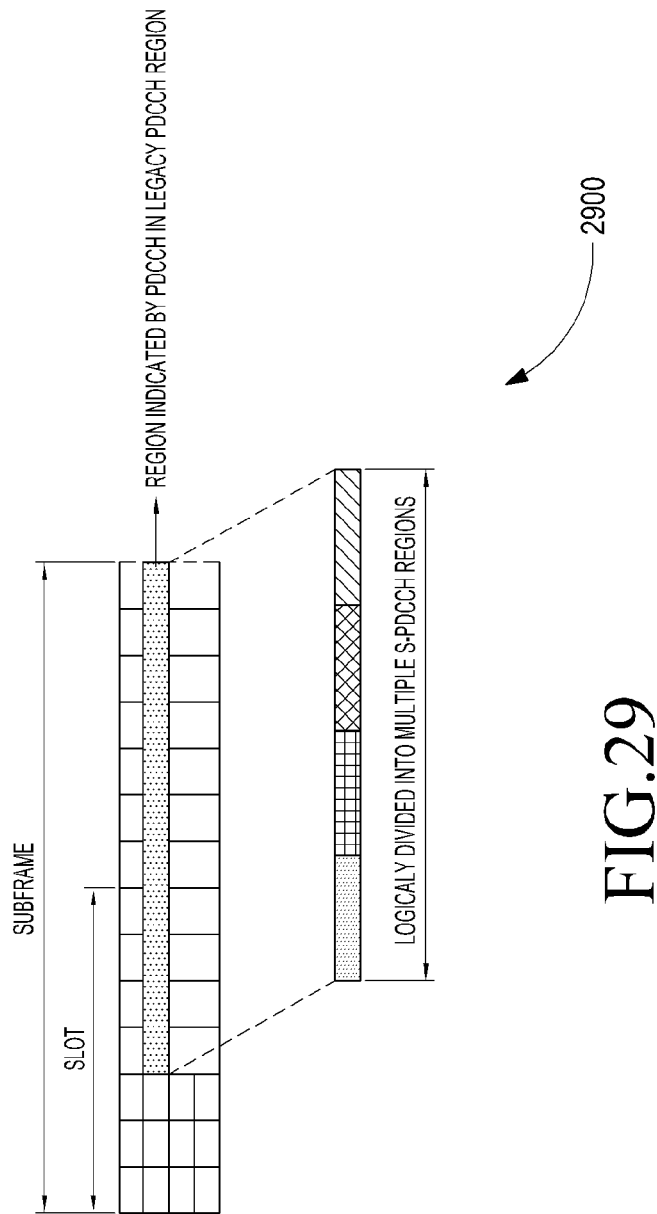
FIG. 29 illustrates a schematic representation of indication location of a Super Mobile Broadband (SMB) Physical Downlink Control Channel (S-PDCCH) region to the MS, according to one embodiment.

FIG. 29 illustrates a schematic representation 2900 of an indication location of an S-PDCCH region to the MS 204, according to one embodiment. The BS 202 indicates S-PDCCH region into a PDCCH region via PDCCH. The S-PDCCH region indicated by the BS 202 is logically divided into multiple S-PDCCH sub regions. The S-PDCCH region may be scattered in frequency domain composing of different subcarriers. The scattered regions are treated as a single whole region for division into multiple S-PDCCH sub regions.

Figure 30A:
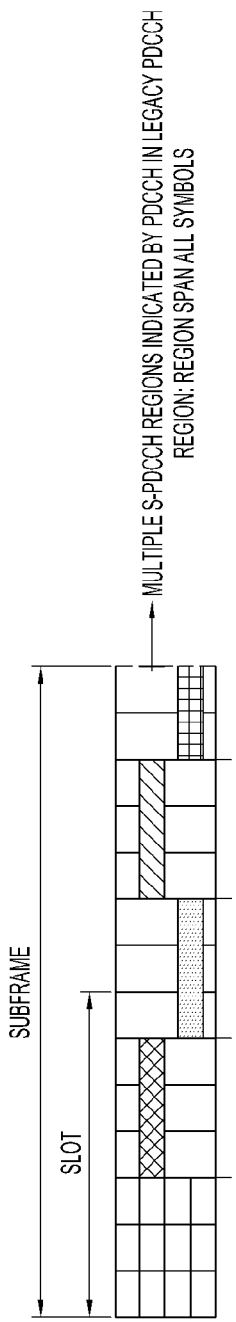
FIGS. 30A-C illustrate schematic representations of indication of location of an S-PDCCH region to the MS, according to another embodiment.
Figure 30B:
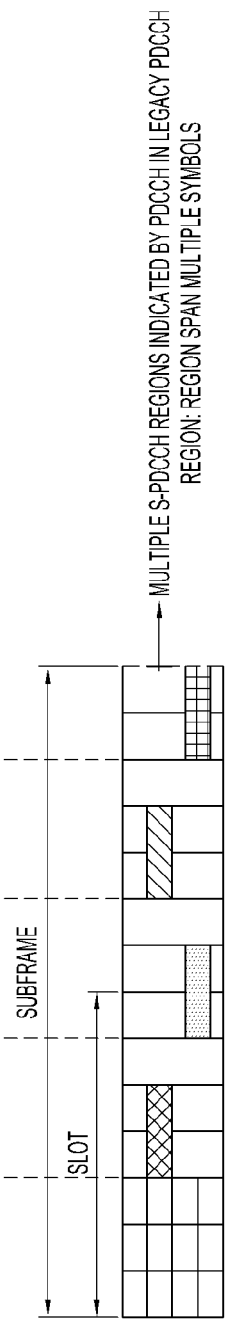
Figure 30C:
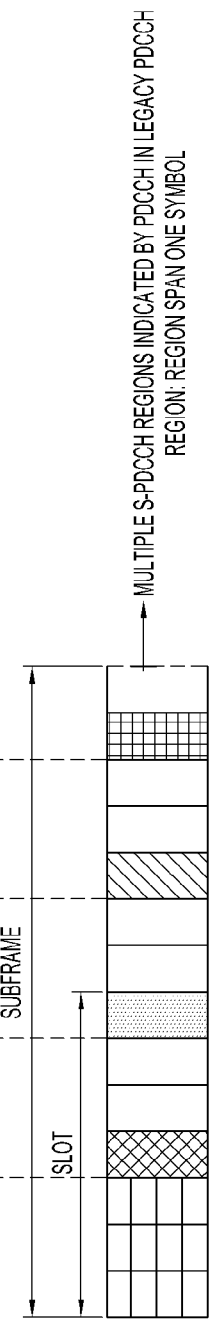

FIGS. 30A-C illustrate schematic representations of indication of location of an S-PDCCH region to the MS 204, according to another embodiment. The BS 202 indicates location of multiple S-PDCCH regions in PDCCH region via a PDCCH. In one embodiment, the multiple S-PDCCH regions together span all portions of data region of subframe in the primary DL carrier. In another embodiment, the multiple S-PDCCH regions in total span multiple but not all symbols in the data region of the subframe in the primary DL carrier. In yet another embodiment, each S-PDCCH region spans a single symbol in the data portion of the subframe in the primary DL carrier. Each S-PDCCH region is located in a different symbol. It can be noted that, mapping of S-PDCCH region to respective allocation intervals is pre-defined and is known to both the MS 204 and the BS 202. It is understood that, embodiments of the present disclosure as illustrated in FIGS. 5 to 19 are also applicable to embodiments illustrated in FIGS. 20 to 28.

In accordance to the embodiments illustrated in FIGS. 5 to 30A, parameters required for alignment of sub frames of a secondary DL carrier and secondary UL carrier includes time duration required to transmit resource allocation information, time duration required for processing the resource allocation information, time duration required to prepare UL packet, and time required for switching and synchronizing to secondary carrier.

When a subframe of the secondary DL carrier and/or the secondary UL carrier is offset with respect to subframe of primary DL carrier, the above parameters are defined to be constant for the asymmetric multicarrier communication network. That is, the values of the said parameters are same for all MSs in the asymmetric multicarrier communication network. In such a scenario, a cumulative value of the said parameters can be defined separately for the secondary DL carrier and the secondary UL carrier. The cumulative value may be either pre-specified or may be broadcasted in broadcast channel information.

When subframes of the secondary DL carrier and the secondary UL carrier are aligned with subframes of the primary DL carrier but DL allocation interval and UL allocation interval are offset to the corresponding sub frame boundaries, the value of the said parameters can be specifically defined each MS. In such a case, the values of the said parameters need to be indicated by each MS 204 to the BS 202. In an exemplary implementation, value of each of these parameters is separately indicated by the MS to the BS. In another exemplary implementation, an indicator of cumulative values of the said parameters can be indicated by each MS 204 to the BS 202. In some embodiments, the MS 204 may indicate the MS's category to the BS 202, where the category is indicative of the cumulative values of the said parameters. For example, a high end MS which has higher processing capability has lower cumulative value of the said parameters while a low end MS which has lower processing capability has higher cumulative value of the said parameters. In such a case, the MS 204 indicates whether the MS is a high end or a low end MS. The MS 202 may indicate the category to the BS 202 via a capability negotiation message. Accordingly, the BS applies the corresponding cumulative value of the said parameters.

Figure 31:
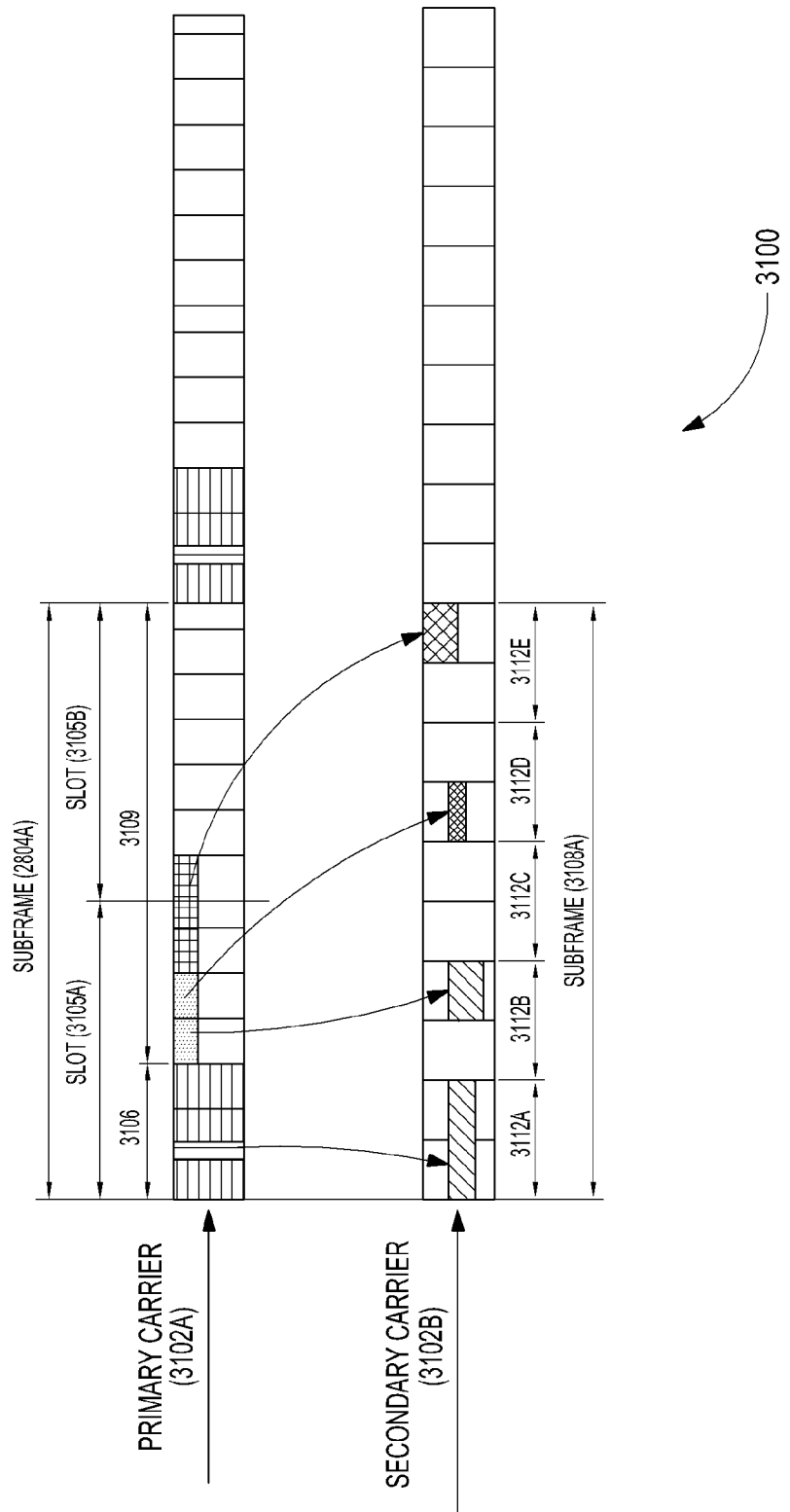
FIG. 31 illustrates a schematic representation of frame structures in a Time Division Duplex (TDD) mode, according to one embodiment.

FIG. 31 illustrates a schematic representation 3100 of frame structures 3102A and 3102B in a Time Division Duplex (TDD) mode, according to one embodiment. The frame structure 3102A includes a plurality of subframes 3104A-N of 1 millisecond duration. Each of the subframes 3104A-N of the primary DL carrier is divided into two slots 3105A and 3105B. The first slot 3105A of the each subframe 3104 contains a PDDCH region 3106 and a data region 3109 whereas the second slot 3105B includes data region 3109. The S-PDCCH region 3107A is located in the PDCCH region 3106 and the S-PDCCH region 3107B is located in the data region 3109. Alternatively, the S-PDCCH regions 3107A-N are located in the data region 3109. It can be noted that, the number of S-PDCCH regions is equal to the number of allocation Intervals in a sub frame of a secondary carrier. The mapping of S-PDCCH regions to allocation interval is pre-defined.

The frame structure 3102B includes a plurality of subframes 3108A-N of 1 millisecond duration. Each subframe 3108 of the secondary carrier is divided into five allocation intervals 3110A-E. The allocation intervals 3110A-E includes three DL allocation intervals 3110A-C and two UL allocation intervals 3110D and 3110E.

As illustrated, the subframes 3108A-N of the secondary carrier are time aligned with the subframes 3104A-N of the primary carrier. Alternatively, the subframes 3108A-N of the secondary carrier are offset by a pre-defined time duration with respect to the subframes 3104A-N of the primary carrier. The pre-defined time duration is equal to time duration for receiving resource allocation information and/or time duration for processing the resource allocation information.

Figure 32:
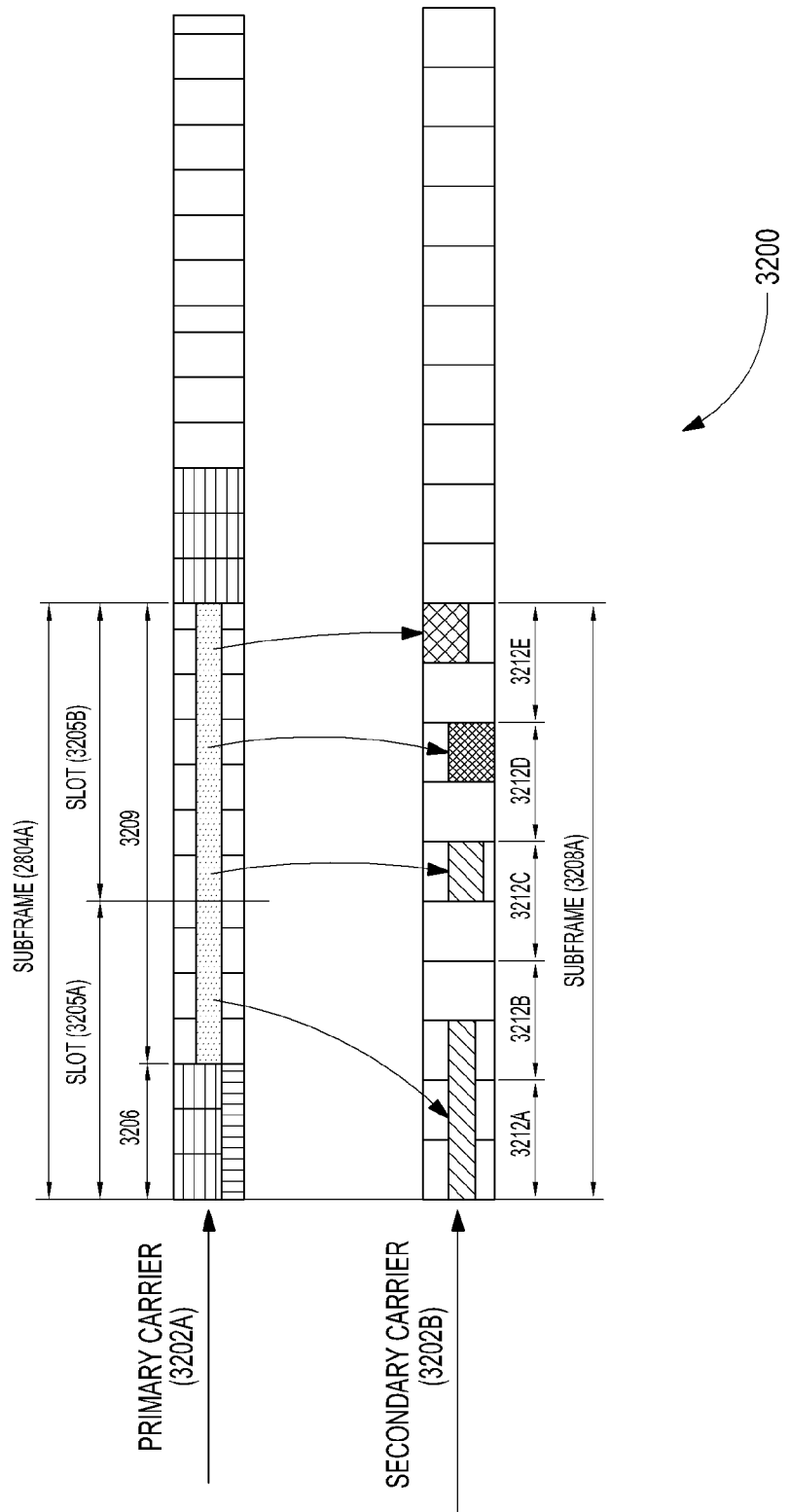
FIG. 32 illustrates a schematic representation of frame structures in the TDD mode, according to another embodiment.

FIG. 32 illustrates a schematic representation 3200 of frame structures 3202A and 3202B in a Time Division Duplex (TDD) mode, according to another embodiment. It can been seen that, the schematic representation 3100 of FIG. 31 is same as the schematic representation 3200 except that information of the S-PDCCH region 3207 in the data region 3209 is indicated in a PDCCH transmitted in the PDCCH region 3206. The S-PDCCH region 3207 may be further divided into multiple S-PDCCH regions such that each S-PDCCH region corresponds to single allocation interval. The mobile station 204 may use a reserved Cell Radio Network Temporary Identifier (C-RNTI) for decoding the PDCCH carrying information of the S-PDCCH region 3207. When there are multiple S-PDCCH regions in the data region 3209, information on each S-PDCCH region is indicated by a different PDCCH. Alternatively, information of S-PDCCH region(s) in the data region 3209 is communicated in a broadcast information (e.g., primary broadcast channel (BCH)). Also, information of S-PDCCH region(s) in the data region 3209 may be communicated in a unicast manner in a signaling message during activation of the secondary carrier. It can be noted that, the BS 202 need not communicate the information on S-PDCCH region(s) if a pre-specified region in the data region 3209 is designated as S-PDCCH region(s).

Figure 33:
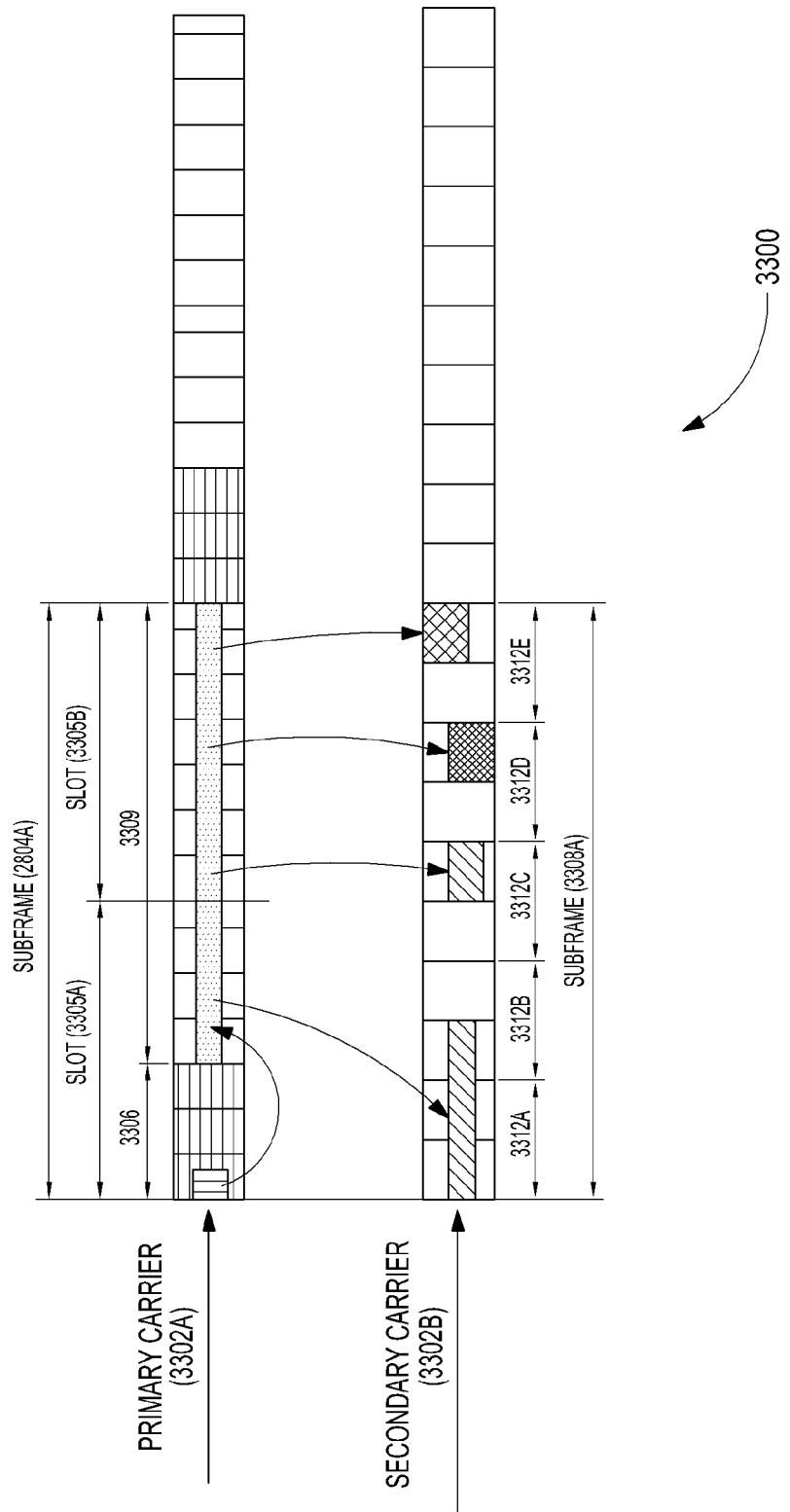
FIG. 33 illustrates a schematic representation of frame structures in the TDD mode, according to yet another embodiment.

FIG. 33 illustrates a schematic representation 3300 of frame structures 3302A and 3302B in a Time Division Duplex (TDD) mode, according to yet another embodiment. It can be noted that the schematic representation 3200 of FIG. 32 is similar to the schematic representation 3300, except location of PDCCH which carries information of S-PDCCH region(s).

Figure 34:
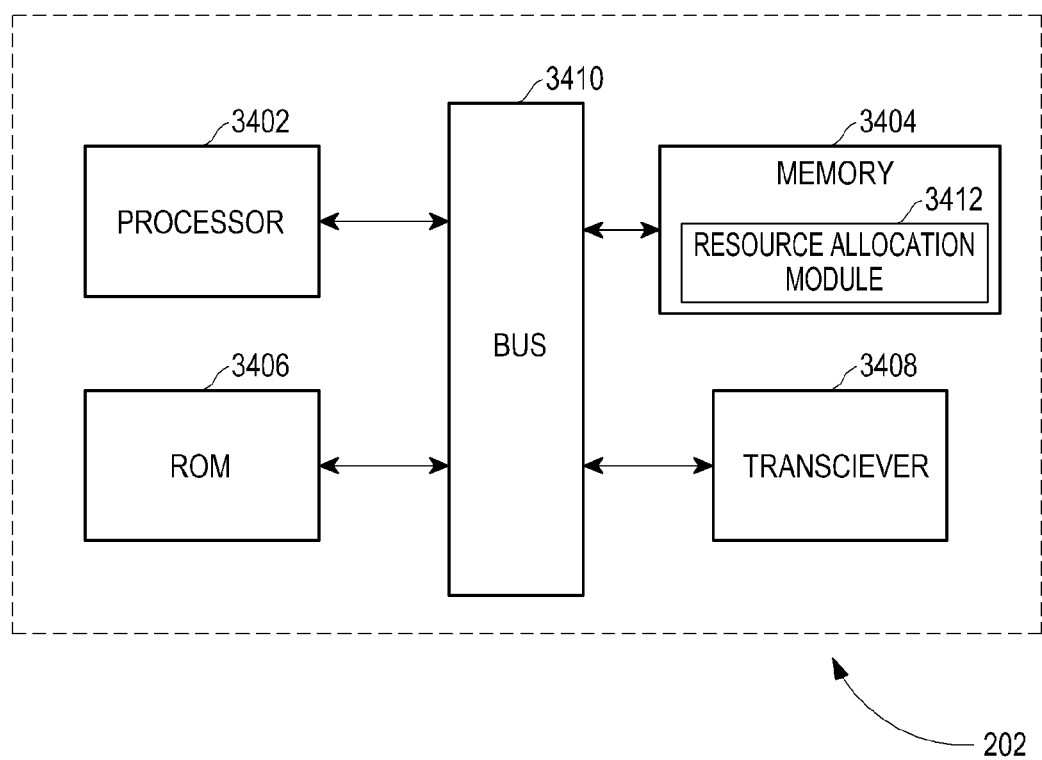
FIG. 34 illustrates a block diagram of an exemplary base station, such as those shown in FIG. 2A, showing various components for implementing embodiments of the present subject matter.

FIG. 34 illustrates a block diagram of the base station 202 showing various components for implementing embodiments of the present subject matter. In FIG. 34, the base station 202 includes a processor 3402, a memory 3404, a read only memory (ROM) 3406, a transceiver 3408, and a bus 3410.

The processor 3402, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 3402 may also include embedded controllers, such as generic or programmable logic devices or arrays, application specific integrated circuits, single-chip computers, smart cards, and the like.

The memory 3404 and the ROM 3406 may be volatile memory and non-volatile memory. The memory 3404 includes a resource allocation module 3412 for allocating resources for one or more transmit time intervals in at least one of downlink allocation interval in a secondary downlink carrier and uplink allocation interval in a secondary uplink carrier, according to one or more embodiments described above. A variety of computer-readable storage media may be stored in and accessed from the memory elements. Memory elements may include any suitable memory devices) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The resource allocation module 3412 may be stored in the form of machine-readable instructions on any of the above-mentioned storage media and may be executable by the processor 3402. For example, a computer program may include machine-readable instructions which when executed by the processor 3402, may cause the processor 3402 to allocate resources for one or more transmit time intervals in at least one of downlink allocation interval in a secondary downlink carrier and uplink allocation interval in a secondary uplink carrier, according to the teachings and herein described embodiments of the present subject matter. In one embodiment, the program may be included on a compact disk-read only memory (CD-ROM) and loaded from the CD-ROM to a hard drive in the non-volatile memory.

The transceiver 3408 may be capable of transmitting resource allocation information in a subframe of a primary downlink carrier. The bus 3410 acts as interconnect between various components of the base station 202.

Figure 35:
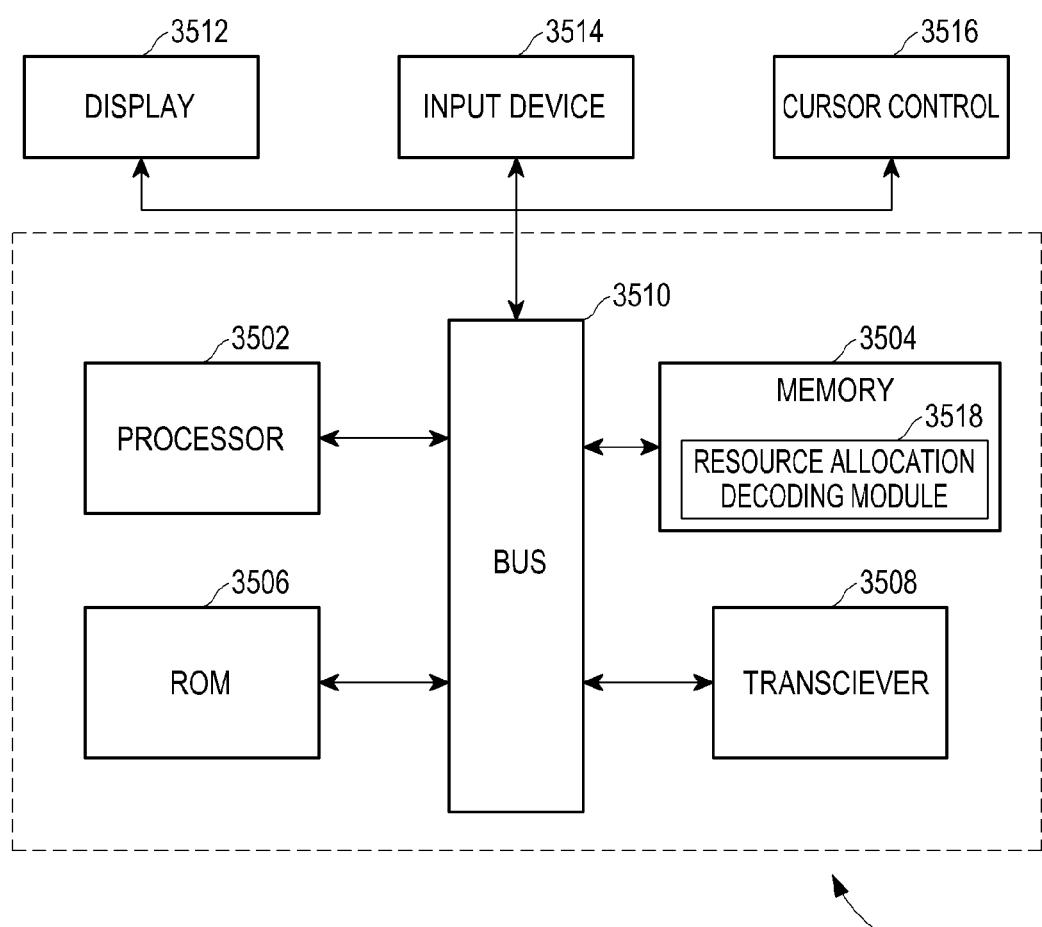
FIG. 35 illustrates a block diagram of an exemplary mobile station, such as those shown in FIG. 2A, showing various components for implementing embodiments of the present subject matter.

FIG. 35 illustrates a block diagram of the mobile station 204 showing various components for implementing embodiments of the present subject matter. In FIG. 35, the mobile station 204 includes a processor 3502, memory 3504, a read only memory (ROM) 3506, a transceiver 3508, a bus 3510, a display 3512, an input device 3514, and a cursor control 3516.

The processor 3502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 3502 may also include embedded controllers, such as generic or programmable logic devices or arrays, application specific integrated circuits, single-chip computers, smart cards, and the like.

The memory 3504 and the ROM 3506 may be volatile memory and non-volatile memory. The memory 3504 includes a resource allocation decoding module 3518 for decoding resource allocation information received from the base station 202 in the subframe of the primary downlink carrier, according to one or more embodiments described in FIG. 4. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The resource allocation decoding module 3518 may be stored in the form of machine-readable instructions on any of the above-mentioned storage media and may be executable by the processor 3502. For example, a computer program may include machine-readable instructions, that when executed by the processor 3502, cause the processor 3502 to decode resource allocation information received from the base station 202 in the subframe of the primary downlink carrier, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 3508 may be capable of receiving the resource allocation information in each subframe of the primary downlink carrier. The bus 3510 acts as interconnect between various components of the mobile station 204. The components such as the display 3512, the input device 3514, and the cursor control 3516 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving resource allocation information in a multicarrier communication system, the method comprising:

receiving resource allocation information in a control region included in a subframe on a primary downlink carrier, wherein the resource allocation information includes information indicating a start time for a downlink allocation interval for a secondary downlink carrier and information indicating a start time for an uplink allocation interval for a secondary uplink carrier, identifying resources allocated in the downlink allocation interval for the secondary downlink carrier and the uplink allocation interval for the secondary uplink carrier based on the resource allocation information, wherein the downlink allocation interval is included in a part of a first subframe and a part of a second subframe on the secondary downlink carrier and starts at a first predefined offset after a start time of the subframe on the primary downlink carrier, wherein the uplink allocation interval is included in a part of a third subframe and a part of a fourth subframe on the secondary uplink carrier and starts at a second predefined offset after the start time of the subframe on the primary downlink carrier, wherein a duration of the downlink allocation interval is equal to a duration of one subframe, and wherein a duration of the uplink allocation interval is equal to the duration of one subframe; and wherein each of frequencies of the secondary downlink carrier and the secondary uplink carrier is higher than a frequency of the primary downlink carrier, and wherein transmission time intervals (TTIs) for both the secondary uplink carrier and the secondary downlink carrier are smaller than TTIs for the primary downlink carrier.

2. The method of claim 1, wherein the downlink allocation interval for the secondary downlink carrier starts at a same time as the subframe on the primary downlink carrier in which the resource allocation information for the downlink allocation interval is transmitted.

3. The method of claim 1, wherein the downlink allocation interval for the secondary downlink carrier starts at the first predefined offset from and during a time duration of the subframe on the primary downlink carrier in which the resource allocation information for the downlink allocation interval is transmitted.

4. The method of claim 3, wherein the first predefined offset is equal to at least one of a time duration of the control region in which the resource allocation information is transmitted, a time duration required for processing the resource allocation information, a time duration required to switch from a primary carrier to a secondary carrier, a time duration required to perform beam forming, or a time duration required to synchronize with the secondary carrier.

5. The method of claim 1, wherein the uplink allocation interval for the secondary uplink carrier starts at the second predefined offset during a time duration of the subframe on the primary downlink carrier in which the resource allocation information for the uplink allocation interval is transmitted.

6. The method of claim 5, wherein the second predefined offset is equal to at least one of a time duration of the control region in which the resource allocation information is transmitted, a time duration required for processing the resource allocation information, a time duration required to switch from a primary carrier to a secondary carrier, a time duration required to synchronize with the secondary carrier, a time duration required to prepare uplink packet based on the resource allocation information, a time duration required to perform beam forming, or a time duration required for uplink timing advance.

7. The method of claim 1, wherein the subframe of the primary downlink carrier and a subframe of the secondary downlink carrier start at a same time, and wherein a subframe of the secondary uplink carrier is offset by a predefined time duration with respect to the subframe of the primary downlink carrier.

8. The method of claim 7, wherein the predefined time duration is equal to at least one of a time duration of the control region in which the resource allocation information is transmitted, a time duration required for processing the resource allocation information, a time duration required to switch from a primary carrier to a secondary carrier, a time duration required to synchronize with the secondary carrier, a time duration required to perform beam forming, a time duration required to prepare uplink packet based on the resource allocation information, or a time duration required for uplink timing advance.

9. The method of claim 1, wherein the subframe of the primary downlink carrier, a subframe of the secondary downlink carrier, and a subframe of the secondary uplink carrier start at a same time.

10. The method of claim 1, wherein the uplink allocation interval for the secondary uplink carrier starts at a same time as a subframe on the secondary uplink carrier.

11. An apparatus for receiving resource allocation information in an multicarrier communication system, the apparatus comprising:

a processor; and a transceiver, wherein the transceiver is configured to receive resource allocation information in a control region included in a subframe on a primary downlink carrier, wherein the resource allocation information includes information indicating a start time for a downlink allocation interval for a secondary downlink carrier and information indicating a start time for an uplink allocation interval for a secondary uplink carrier, wherein the processor is configured to identify resources allocated in the downlink allocation interval for the secondary downlink carrier and the uplink allocation interval for the secondary uplink carrier based on the resource allocation information, wherein the downlink allocation interval is included in a part of a first subframe and a part of a second subframe on the secondary downlink carrier and starts at a first predefined offset after a start time of the subframe on the primary downlink carrier, wherein the uplink allocation interval is included in a part of a third subframe and a part of a fourth subframe on the secondary uplink carrier and starts at a second predefined offset after the start time of the subframe on the primary downlink carrier, wherein a duration of the downlink allocation interval is equal to a duration of one subframe, and wherein a duration of the uplink allocation interval is equal to the duration of one subframe, and wherein each of frequencies of the secondary downlink carrier and the secondary uplink carrier is higher than a frequency of the primary downlink carrier, and wherein transmission time intervals (TTIs) for both the secondary uplink carrier and the secondary downlink carrier are smaller than TTIs for the primary downlink carrier.

12. The apparatus of claim 11, wherein the downlink allocation interval for the secondary downlink carrier starts at a same time as the subframe on the primary downlink carrier in which the resource allocation information for the downlink allocation interval is transmitted.

13. The apparatus of claim 11, wherein the downlink allocation interval for the secondary downlink carrier starts at the first predefined offset from and during a time duration of the subframe on the primary downlink carrier in which the resource allocation information for the downlink allocation interval is transmitted.

14. The apparatus of claim 13, wherein the first predefined offset is equal to at least one of a time duration of the control region in which the resource allocation information is transmitted, a time duration required for processing the resource allocation information, a time duration required to switch from a primary carrier to a secondary carrier, a time duration required to perform beam forming, or a time duration required to synchronize with the secondary carrier.

15. The apparatus of claim 11, wherein the uplink allocation interval for the secondary uplink carrier starts at the second predefined offset during a time duration of the subframe on the primary downlink carrier in which the resource allocation information for the uplink allocation interval is transmitted.

16. The apparatus of claim 15, wherein the second predefined offset is equal to at least one of a time duration of the control region in which the resource allocation information is transmitted, a time duration required for processing the resource allocation information, a time duration required to switch from a primary carrier to a secondary carrier, a time duration required to synchronize with the secondary carrier, a time duration required to prepare uplink packet based on the resource allocation information, a time duration required to perform beam forming, or a time duration required for uplink timing advance.

17. The apparatus of claim 11, wherein the subframe of the primary downlink carrier and a subframe of the secondary downlink carrier start at a same time, and wherein a subframe of the secondary uplink carrier is offset by a predefined time duration with respect to the subframe of the primary downlink carrier.

18. The apparatus of claim 17, wherein the predefined time duration is equal to at least one of a time duration of the control region in which the resource allocation information is transmitted, a time duration required for processing the resource allocation information, a time duration required to switch from a primary carrier to a secondary carrier, a time duration required to synchronize with the secondary carrier, a time duration required to perform beam forming, a time duration required to prepare uplink packet based on the resource allocation information, or a time duration required for uplink timing advance.

19. The apparatus of claim 11, wherein the subframe of the primary downlink carrier, a subframe of the secondary downlink carrier, and a subframe of the secondary uplink carrier start at a same time, and wherein the uplink allocation interval for the secondary uplink carrier starts at a same time as a subframe on the secondary uplink carrier.

* * * * *